United States Patent
Xu et al.

(10) Patent No.: US 10,733,061 B2
(45) Date of Patent: Aug. 4, 2020

(54) HYBRID DATA STORAGE SYSTEM WITH PRIVATE STORAGE CLOUD AND PUBLIC STORAGE CLOUD

(71) Applicant: Western Digital Technologies, Inc., San Jose, CA (US)

(72) Inventors: Jun Xu, Singapore (SG); Wei Xi, Mission Viejo, CA (US); Guoxiao Guo, Irvine, CA (US); Eric Bjornson, Sunnyvale, CA (US); Jie Yu, Irvine, CA (US); Ling Chih Wei, Singapore (SG)

(73) Assignee: Western Digital Technologies, Inc., San Jose, CA (US)

( * ) Notice: Subject to any disclaimer, the term of this patent is extended or adjusted under 35 U.S.C. 154(b) by 149 days.

(21) Appl. No.: 15/635,039

(22) Filed: Jun. 27, 2017

(65) Prior Publication Data

US 2018/0373600 A1   Dec. 27, 2018

(51) Int. Cl.
   *G06F 11/14*   (2006.01)
   *G06F 21/60*   (2013.01)
   (Continued)

(52) U.S. Cl.
   CPC .......... *G06F 11/1464* (2013.01); *G06F 3/065* (2013.01); *G06F 3/067* (2013.01);
   (Continued)

(58) Field of Classification Search
   CPC .. G06F 11/1464; G06F 11/08; G06F 21/6227; G06F 21/602; G06F 3/0643;
   (Continued)

(56) References Cited

U.S. PATENT DOCUMENTS

| 4,801,279 A | 1/1989 | Nakanishi |
| 8,805,951 B1 * | 8/2014 | Faibish ................. G06F 9/5072 709/213 |

(Continued)

FOREIGN PATENT DOCUMENTS

| EP | 2755161 A1 | 7/2014 |
| WO | 2013142008 A1 | 9/2013 |
| WO | 2014108182 A1 | 7/2014 |

OTHER PUBLICATIONS

Chih Wei Ling and Anwitaman Datta, InterCloud RAIDer: A Do-It-Yourself Multi-cloud Private Data Backup System, M. Chatterjee et al. (Eds.): ICDCN 2014, Springer LNCS 8314, pp. 453-468, 2014.

(Continued)

*Primary Examiner* — Meng Li
(74) *Attorney, Agent, or Firm* — Chang & Hale LLP

(57) ABSTRACT

Systems and methods are disclosed for accessing data on a storage system. An apparatus, such as a data storage device or a computing device, may include a memory configured to store data. The apparatus is configured to determine an importance level for a file to be stored in the storage system. The data storage system includes one or more private storage clouds and one or more public storage clouds. The apparatus is also configured to generate a set of recovery data chunks based on the file and the importance level. The apparatus is further configured to store the set of recovery data chunks in the set of public storage clouds. The apparatus is further configured to store at least a portion of the file in the private storage cloud.

20 Claims, 10 Drawing Sheets

(51) Int. Cl.
*G06F 3/06* (2006.01)
*G06F 21/62* (2013.01)
*H04L 9/08* (2006.01)
*H04L 29/08* (2006.01)
*G06F 11/10* (2006.01)

(52) U.S. Cl.
CPC .......... *G06F 3/0619* (2013.01); *G06F 3/0623* (2013.01); *G06F 3/0643* (2013.01); *G06F 11/1076* (2013.01); *G06F 11/1451* (2013.01); *G06F 21/602* (2013.01); *G06F 21/6227* (2013.01); *H04L 9/085* (2013.01); *H04L 67/1097* (2013.01); *G06F 2201/805* (2013.01); *G06F 2201/81* (2013.01); *H04L 67/1004* (2013.01); *H04L 67/1095* (2013.01)

(58) Field of Classification Search
CPC ...... G06F 11/1451; G06F 3/067; G06F 3/065; G06F 3/0619; G06F 2201/805; G06F 2201/81; H04L 67/1097; H04L 67/1004; H04L 9/085; H04L 67/1095
See application file for complete search history.

(56) References Cited

U.S. PATENT DOCUMENTS

| | | | |
|---|---|---|---|
| 9,128,626 B2 | 9/2015 | Chacko | |
| 2013/0204849 A1* | 8/2013 | Chacko | G06F 3/0604 707/692 |
| 2014/0289492 A1 | 9/2014 | Ranjith Reddy et al. | |
| 2014/0366155 A1 | 12/2014 | Chang et al. | |
| 2015/0163303 A1 | 6/2015 | Banas | |
| 2016/0132697 A1* | 5/2016 | Simske | G06F 21/6254 726/26 |
| 2016/0162693 A1* | 6/2016 | Breuer | G06F 21/602 713/164 |
| 2017/0005797 A1* | 1/2017 | Lanc | H04L 9/0894 |
| 2017/0371571 A1* | 12/2017 | Danilov | G06F 3/0619 |
| 2018/0084052 A1* | 3/2018 | Trachy | H04L 67/1097 |

OTHER PUBLICATIONS

Dan Dobre, Paolo Viotti, Marko Vukolic, Hybris: Robust Hybrid Cloud Storage, SOCC 2014, 5th annual ACM Symposium on Cloud Computing, Nov. 3-5, Seattle, WA, USA.

James S. Plank and Mario Blaum, Sector-Disk (SD) Erasure Codes for Mixed Failure Modes in RAID Systems, ACM Transactions on Storage, vol. 10, No. 1, Article 4, Publication date: Jan. 2014.

Co-pending U.S. Appl. No. 15/635,056, which shares the same disclosure as the present application, and all art cited therein now and in the future.

International Search Report and Written Opinion for PCT/US2018/023980 dated Jun. 1, 2018.

Mar Kheng Kok et al: "Securing Cloud Data Using Information Disperal", 2016 14th Annual Conference on Privacy, Security and Trust (PST) IEEE, Dec. 12, 2016, pp. 445-448.

International Search Report and Written Opinion dated Jun. 14, 2018 for application PCT/US2018/023988, which shares a specification with the present application.

* cited by examiner

| File Name | Chunk ID | Chunk Location | Recovery Data ID | Recovery Data Location |
|---|---|---|---|---|
| FILE A | CHUNK A1 | PUBLIC STORAGE CLOUD1 | S RECOVERY DATA A1 | PUBLIC STORAGE CLOUD1 |
| | CHUNK A2 | PUBLIC STORAGE CLOUD2 | S RECOVERY DATA A2 | PUBLIC STORAGE CLOUD2 |
| | CHUNK A3 | PUBLIC STORAGE CLOUD3 | S RECOVERY DATA A3 | PUBLIC STORAGE CLOUD3 |
| | | | S RECOVERY DATA A4 | PUBLIC STORAGE CLOUD1 |
| | | | S RECOVERY DATA A5 | PUBLIC STORAGE CLOUD2 |
| | | | S RECOVERY DATA A6 | PUBLIC STORAGE CLOUD3 |
| FILE B | | | NS RECOVERY DATA B1 | PRIVATE STORAGE CLOUD1 |
| | | | NS RECOVERY DATA B2 | PUBLIC STORAGE CLOUD1 |
| | | | NS RECOVERY DATA B3 | PUBLIC STORAGE CLOUD2 |
| | | | NS RECOVERY DATA B4 | PUBLIC STORAGE CLOUD3 |
| | | | NS RECOVERY DATA B5 | PUBLIC STORAGE CLOUD1 |

TABLE 300

*FIG. 3*

HYBRID DATA STORAGE SYSTEM WITH PRIVATE STORAGE CLOUD AND PUBLIC STORAGE CLOUD

BACKGROUND

Field

The present disclosure relates to data storage systems. In particular, the present disclosure relates to data storage systems that may store data, such as files.

Description of Related Art

Users may store data, such as files in various types of data storage systems. One type of data storage system may be a private storage cloud. A private storage cloud may be a storage network (e.g., data storage devices, server computers, networks, etc.) that provides certain users (e.g., authorized users, employees, a family/household) with access to data stored in (the storage space) of the private storage cloud. A private storage cloud may be used by a household, a company/corporation, etc. Another type of data storage system may be a public storage cloud. A public storage cloud may be a storage network (e.g., data storage devices, server computers, networks, etc.) that provides the general public with access to data stored in (the storage space) of the public storage cloud. A public storage cloud may be maintained and/or provided by a storage provider.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 3 is a table illustrating example metadata, in accordance with one or more embodiments.

DETAILED DESCRIPTION

Figure 1:
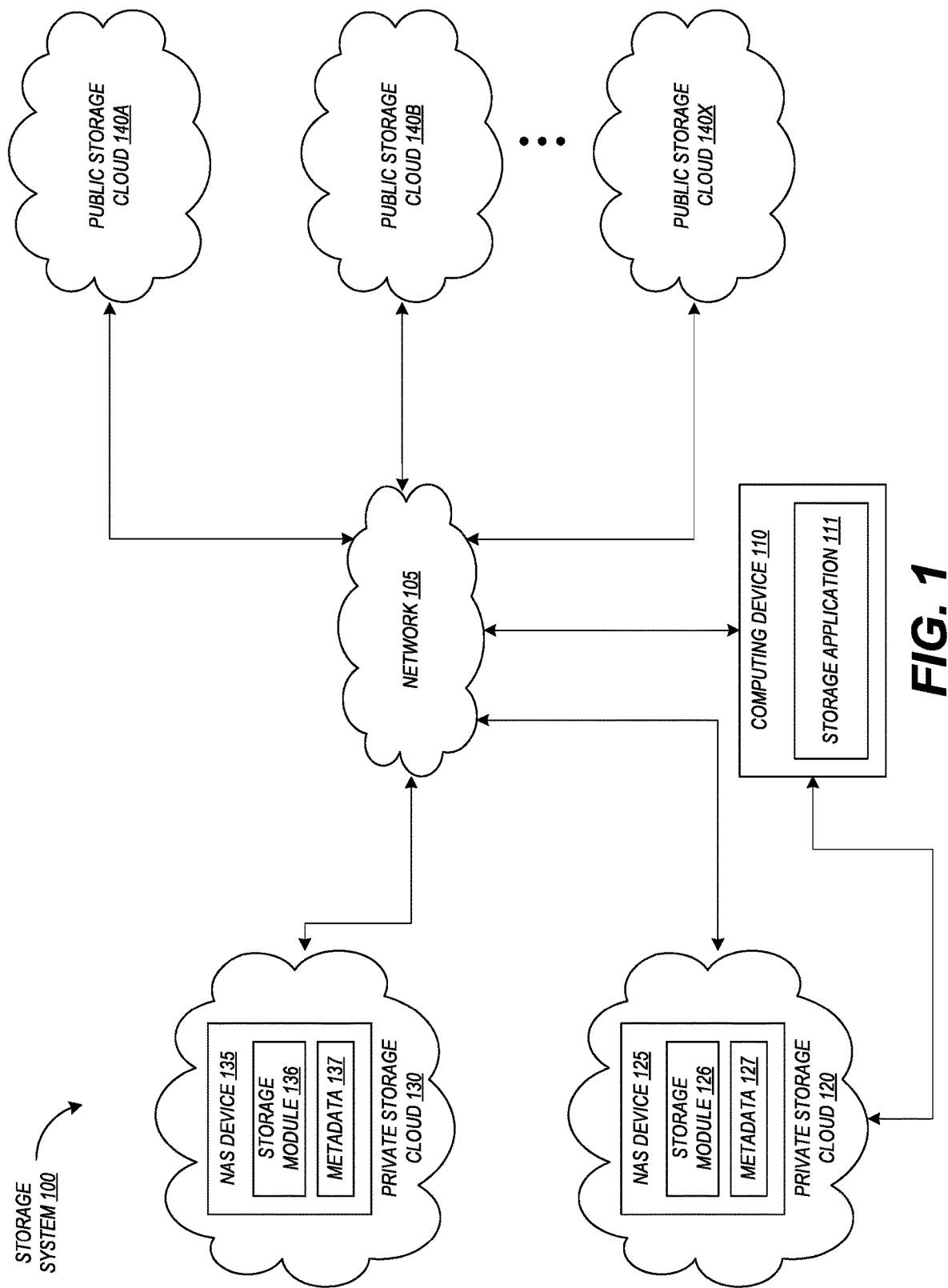
FIG. 1 is a diagram illustrating a storage system, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Storage Clouds

As discussed above, users may store data in a private storage cloud or a public storage cloud. A private storage cloud may be a storage network that provides certain users with access to data stored in (the storage space) of the private storage cloud, as discussed above. A public storage cloud may be a storage network that provides the general public with access to data stored in (the storage space) of the public storage cloud, as discussed above.

A private storage cloud may provide users with a higher level of privacy and/or security because access to the private storage cloud may restricted to certain users (e.g., members of a household, employees of a company, etc.) and may be restricted by geographical location (e.g., within a building, a house, etc.). However, access to the private storage cloud may be slower when users are not within the private storage cloud (e.g., are not on a local-area network (LAN) provided by the private storage cloud) and/or geographical location. In addition, a private storage cloud may be less reliable because the private storage cloud may not protect against data loss as well when compared to a public storage cloud. A public storage cloud may provide users with faster access when users are not within the private storage cloud (e.g., when users are on a wide-area network (WAN), a cellular network, etc.). However, a public storage cloud may be easier to compromise because the general public may have access to the public storage cloud. For example, the username and password for a user's account on the public storage cloud may be compromised.

Certain embodiments described herein provide the ability to distribute (e.g., store) chunks of a file (e.g., file chunks, recovery data chunks, etc.) across one or more private storage clouds and one or more public storage clouds. The chunks of the file may optionally be encrypted prior to distributing the chunks of the file to the private storage clouds and/or public storage clouds. In some embodiments, distributing the file chunks (for a file) and/or recovery data chunks (e.g., systematic recovery data chunks, non-systematic recovery data chunks) across the private storage clouds and the public storage clouds may allow a user faster access to the file, regardless of the location of the user (e.g., whether the user is on a LAN of a private storage cloud or using a WAN), as discussed in more detail below. In other embodiments, distributing the set of chunks across the private storage clouds and the public storage clouds may also help increase the security of the storage system as discussed in more detail below. In further embodiments, encrypting the file chunks and/or the recovery data chunks may also increase the security of the storage system as discussed in more detail below.

Hybrid Storage System

FIG. 1 is a diagram of a storage system 100, in accordance with one or more embodiments. The system architecture includes a network 105, a private storage cloud 120, a private storage cloud 130, public storage clouds 140A though 140X, and computing device 110 (e.g., a client computing device). Private storage cloud 120, private storage cloud 130, and public storage clouds 140A through 140X may be coupled to the network 105. The network 105 may include one or more of an ad hoc network, a peer to peer communication link, an intranet, an extranet, a virtual private network (VPN), a public network (e.g., the Internet), a private network (e.g., a local area network (LAN)), or wide area network (WAN) such as the Internet, a wired network (e.g., Ethernet network), a wireless network (e.g., an 802.11 network, a Wi-Fi network, a wireless LAN (WLAN), a wireless WAN (WWAN), etc.), a cellular network (e.g., a Long Term Evolution (LTE) network), a metropolitan area network (MAN), a portion of the Internet, a portion of the Public Switched Telephone Network (PSTN), routers, hubs, switches, server computers, other types of computer network, and/or a combination thereof.

In one embodiment, each of the private storage clouds 120 through 130 and the public storage clouds 140A through 140X may include a network. For example, private storage cloud 120 may include a local-area network (LAN) that may allow computing devices coupled to the LAN to communicate with each other and/or the NAS device 125. The computing devices on the LAN may access the network 105 via the LAN. In another example, the public storage cloud 140A may include a LAN and/or a wide area network (WAN).

Computing device 110 includes storage application 111. The storage application 111 may be an application (e.g., software, an app, etc.) that allows a user to access data (e.g., files) stored in the storage system 100 (e.g., stored in one or more of the private storage clouds 120 through 130 and public storage clouds 140A through 140X). The storage application 111 may communicate with the private storage clouds 120 through 130 and the public storage clouds 140A through 140X using a representation state transfer (REST) based interface. For example, one or more of the private storage clouds 120 through 130 and the public storage clouds 140A through 140X may provide application programming interfaces (APIs) that may be used by the storage application 111 to communicate (e.g., transmit and/or receive data such as messages, files, etc.) with the private storage clouds 120 through 130 and the public storage clouds 140A through 140X. The computing device 110 may access a files in the storage system 100 via the network 105 and/or via one or more of the private storage clouds 120 through 130. Examples of computing devices may include, but are not limited to, phones (e.g., smart phones, cellular phones, etc.), cable set-top boxes, smart TV's, game consoles, laptop computers, tablet computers, desktop computers, wearable computers, and/or other network-connected computing devices.

Private storage cloud 120 includes network-access storage (NAS) device 125 and private storage cloud 130 includes NAS device 135. NAS device 125 includes storage module 126 and metadata 127. NAS device 135 includes storage module 136 and metadata 137. Storage module 136, storage module 126, metadata 127, and metadata 137 are discussed in more detail below. NAS devices 125 and 135 may include one or more data storage devices (e.g., multiple storage drives such as hard drives, solid state drives (SSDs), etc.). A storage drive may comprise magnetic media, hard disk media, and/or solid-state media. While certain description herein may refer to solid state memory or flash memory generally, it is understood that solid state memory and/or flash memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In some embodiments, computing device 110 may be coupled to the network 105. The computing device 110 may access the private storage clouds 120 through 130 and the public storage clouds 140A through 140X via the network 104. In other embodiments, the computing device 110 may be coupled to the private storage cloud 120. The computing device 110 may access the network 105 and the public storage clouds 140A through private storage cloud 120 (e.g., through a LAN provided by the private storage cloud 120).

The storage module 126 may receive a file to be stored in the storage system 100. For example, a user of the computing device 110 may write (e.g., upload, transmit, etc.) a file to the storage system 100 using the storage application 111. In one embodiment, the storage module 126 (and/or storage module 136) may determine importance levels for files to be stored in the storage system 100 (e.g., store on a hybrid storage cloud). For example, the storage module 126 may analyze the file and/or the contents of the file to determine the importance level of the file. In another example, the storage module 126 may determine the importance level of the file based on data/input received from a user of the storage system 100 (e.g., a user may provide the importance level for the file using storage application 111). In a further example the storage module 126 may determine the importance level of the file based on a configuration file/setting. In some embodiments, an importance level for a file may be data (e.g., a number, a value, an alphanumeric string, etc.) that may indicate the importance of the file to a user of the storage system 100. For example, the importance level of a file may indicate how valuable the file is to a user. In another example, the importance level may be used to determine how the file should be distributed among the private storage clouds 120 through 130 and the public storage clouds 140A through 140X (e.g., whether the file should be distributed among the public storage clouds 140A through 140X). One having ordinary skill in the art understands that various representations may be used to represent the importance levels and various numbers of importance levels may be used. For example, the storage system 100 may have three, five, ten, etc., importance levels. In another example, a numerical representation may be used such that the higher the number, the higher the importance level (or vice versa).

In one embodiment, the storage module 126 (and/or storage module 136) may generate a set of recovery data chunks based on the file and/or the importance level for the file (e.g., the importance level associated with the file). The recovery data chunks may be used to recover (e.g., regenerate, reconstruct, rebuild, etc.) the file if the file (or portions of the file) are lost, deleted, corrupted, damaged, inaccessible, etc. The recovery data chunks may prevent the file from being lost and may also provide a computing device and/or a user with faster access to the file, as discussed in more detail below. The set of recovery data chunks may also be referred to as recovery data.

In one embodiment, the set of recovery data chunks may include systematic recovery data. Systematic recovery data may be error recovery data that may be used to recover the file when the file (or portions of the file) is lost, deleted, corrupted, damaged, inaccessible, etc. Systematic recovery data may be error recovery data that is generated in addition to the file. For example, systematic recovery data may be error recovery data that is separate from the file. Examples of systematic recovery data may include redundant array of independent disks (RAID) parity data, data generated using error correction codes (ECCs), data generated using a low-density parity-check (LDPC) code, etc. In another embodiment, the set of recovery data chunks may include non-systematic recovery data. Non-systematic recovery data may be error recovery data that may also be used to recover the file when the file (or portions of the file) is lost, deleted, corrupted, damaged, inaccessible, etc. Non-systematic recovery data may be error recovery data where the file is included in the non-systematic recovery data. For example, the file and the non-systematic recovery data may be combined such that the file is no longer distinguishable from the non-systematic recovery data. Examples of non-systematic recovery data may include data generated using erasure codes.

In one embodiment, a threshold number of recovery data chunks (e.g., systematic recovery data chunks, non-systematic recovery data chunks, etc.) may be used to recover, reconstruct, regenerate, etc., a file using the recovery data chunks. For example, ten recovery data chunks may be generated for a file. Any five of the ten recovery data chunks may be used to reconstruct the file. The threshold (e.g., minimum) number of recovery data chunks used to reconstruct the file may vary based on the data recovery (or error recovery) schemes/codes used to generate the recovery data chunks.

In one embodiment, the storage module 126 (and/or storage module 136) may store the set of recovery data chunks in one or more of the public storage clouds 140A through 140X, as discussed in more detail below. For example, the storage module 126 may evenly distribute the set of recovery data chunks across one or more of the public storage clouds 140A through 140X. In another example, the storage module 126 may prefer certain public storage clouds. This may help prevent the data from being lost and may allow faster access to the file, as discussed in more detail below.

In one embodiment, the storage module 126 (and/or storage module 136) may store the set of recovery data chunks on the public storage clouds 140A through 140X by transmitting the set of recovery data chunks to the public storage clouds 140A through 140X. The storage module 126 may optionally wait for acknowledgements that the set of recovery data chunks was received by the public storage clouds 140A through 140X. For example, the storage module 126 may transmit one recovery data chunk to each of the public storage clouds 140A through 140X and may wait for acknowledgements from each of the public storage clouds 140A through 140X. An acknowledgement from a public storage cloud may indicate that the public storage cloud has successfully received and/or stored a chunk of data. The storage module 126 may wait for acknowledgements based on a setting/configuration, user input (e.g., an option selected by a user), etc.

In one embodiment, the storage module 126 (and/or storage module 136) may store at least a portion of the file in the private storage cloud 120 and/or private storage cloud 130, as discussed in more detail below. For example, the storage module 126 may store the file (e.g., the whole file, the complete file) in the private storage cloud 120 (e.g., in the NAS device 125). In another example, the storage module 126 may divide the file into a set of file chunks (e.g., into different chunks, portions, pieces, etc.) and may store one or more of the chunks (e.g., file chunks) in the private storage cloud 120 (e.g., in the NAS device 125).

In one embodiment, the storage module 126 (and/or storage module 136) may divide the file into the set of chunks (e.g., a set of file chunks) based on an importance level of the file. For example, if the importance level of the file is above a first importance threshold (e.g., a first threshold importance level), the storage module 126 may divide the file into the set of chunks and may store the set of chunks in one or more of the public storage clouds 140A through 140X. For example, the storage module may distribute the set of chunks across the public storage clouds 140A through 140X. The storage module 126 may also store the set of chunks in the private storage cloud 120, as discussed above.

In one embodiment, the storage module 126 (and/or storage module 136) may also determine a privacy level for the file. For example, the storage module 126 may analyze the file and/or the contents of the file to determine the privacy level of the file. In another example, the storage module 126 may determine the privacy level of the file based on data/input received from a user of the storage system 100 (e.g., a user may provide the privacy level for the file using storage application 111). In a further example the storage module 126 may determine the privacy level of the file based on a configuration file/setting. In some embodiments, a privacy level for a file may be data (e.g., a number, a value, an alphanumeric string, etc.) that may indicate how private and/or public the file is to a user of the storage system 100. For example, the privacy level of a file may indicate how much the user would like the file to remain private (e.g., how much the user would like to prevent others from accessing the file). One having ordinary skill in the art understands that various representations may be used to represent the privacy levels and various numbers of privacy levels may be used. For example, the storage system 100 may have three, five, ten, etc., privacy levels. In another example, a numerical representation may be used such that the higher the number, the higher the privacy level (or vice versa).

In one embodiment, the storage module 126 (and/or storage module 136) may encrypt the set of chunks (of the file) before storing the set of chunks in one or more of the public storage clouds 140A through 140X, based on the privacy level. For example, the storage module 126 may encrypt the set of chunks (of the file) if the privacy level of the file is above a privacy threshold (e.g., is greater than a threshold privacy level). The storage module 126 may use different types, methods, algorithm, operations, functions, etc., for encrypting the set of chunks based on the privacy level. For example, the storage module 126 may use a 256-bit encryption algorithm (e.g., a 256-bit Advanced Encryption Standard (AES)) if the file has the highest privacy level. In another example, the storage module may use a 128-bit encryption algorithm if the file has the second highest privacy level.

In one embodiment, the storage module 126 may also encrypt the recovery data chunks (e.g., the systematic recovery data chunks and/or non-systematic recovery data chunks) for a file, based on the privacy level. For example, the storage module 126 may encrypt the recovery data chunks (of the file) if the privacy level of the file is above the privacy threshold. The storage module 126 may use different types, methods, algorithm, operations, functions, etc., for encrypting the set of chunks based on the privacy level, as discussed above.

In one embodiment, the storage module 126 (and/or storage module 136) may determine a trust level for the private storage cloud 120 (and/or private storage cloud 130). For example, the storage module 126 may analyze the security settings, parameters, protocols, encryption, etc., used by the private storage cloud to determine the trust level for the private storage cloud. In another example, the storage module 126 may determine the trust level for the private storage cloud 120 based on data/input received from a user of the storage system 100 (e.g., a user may provide the trust level for the private storage cloud 120 and/or the trust level for the private storage cloud 130 using storage application 111). In a further example the storage module 126 may determine the trust level for the private storage cloud 120 based on a configuration file/setting. In some embodiments, a trust level for a private storage cloud may be data (e.g., a number, a value, an alphanumeric string, etc.) that may indicate how much the user trusts the NAS 125. For example, the trust level may indicate how secure the NAS 125 (or the private storage cloud 120) seems to the user. In another example, the trust level may indicate how reliable the NAS 125 (and/or the private storage cloud 120) seems to the user. One having ordinary skill in the art understands that various representations may be used to represent the trust levels and various numbers of trust levels may be used. For example, the storage system 100 may have three, five, ten, etc., trust levels. In another example, a numerical representation may be used such that the higher the number, the higher the trust level (or vice versa).

In one embodiment, the storage module 126 (and/or storage module 136) may store all portions of the file in the private storage cloud 120 if the trust level of the private storage cloud 120 is above a threshold trust level. For example, the storage module 126 may store the complete file (e.g., all chunks, portions, pieces, etc.) of the file on the NAS device 125 if the trust level of the private storage cloud 120 is above a threshold trust level. If the trust level of the private storage cloud 120 is not above the threshold trust level (e.g., is less than or equal to the threshold trust level), the storage module 126 may determine whether the importance level of the file is below a first importance level. If the importance level of the file is below the first importance level (and the trust level of the private storage cloud 120 is not above the threshold trust level), the storage module 126 may store the file in the private storage cloud 120.

In one embodiment, the storage module 126 (and/or storage module 136) may also determine a hotness level for the file. For example, the storage module 126 may analyze the file and/or the contents of the file to determine the hotness level of the file. In another example, the storage module 126 may determine the hotness level of the file based on data/input received from a user of the storage system 100 (e.g., a user may provide the hotness level for the file using storage application 111). In a further example the storage module 126 may determine the hotness level of the file based on a configuration file/setting. In some embodiments, a hotness level for a file may be data (e.g., a number, a value, an alphanumeric string, etc.) that may indicate how often a file may be accessed. For example, the hotness level may indicated how often the file may be read, written to, updated/modified, etc. One having ordinary skill in the art understands that various representations may be used to represent the hotness levels and various numbers of hotness levels may be used. For example, the storage system 100 may have two, three, five, ten, etc., hotness levels. In another example, a numerical representation may be used such that the higher the number, the higher the hotness level (or vice versa).

In one embodiment, the storage module 126 (and/or storage module 136) may divide the set of file into a set of chunks (e.g., a set of file chunks) based on the hotness level of the file and the privacy level of the file. For example, if the hotness level of the file is above a threshold hotness level (e.g., a hotness threshold) and the privacy level for the file is below the threshold privacy level, the storage module 126 may divide the file into the set of chunks and may store the set of chunks in one or more of the public storage clouds 140A through 140X. For example, the storage module may distribute across the set of chunks across the public storage clouds 140A through 140X.

In one embodiment, the storage module 126 (and/or storage module 136) may determine that a file has been updated. For example, the storage module 126 may determine that a user has changed, added, and/or removed the content of the file. The storage module 126 may receive data indicating that a file has been updated from one or more of the public storage clouds 140A through 140X, and/or one or more of the private storage clouds 120 through 130. For example, when a user updates a file, the storage application 111 may transmit a message to the storage module 126 indicating that the file has been updated and/or may transmit the updated file to the storage module 126. The storage module 126 may generate a second set of recovery data chunks based on the updated file and/or the importance level for updated the file, as discussed above. For example, the storage module 126 may generate a second set of systematic recovery data chunks or a second set of non-systematic recovery data chunks. The storage module 126 may also store the second set of recovery data chunks in one or more of the public storage clouds 140A through 140X, as discussed above. The storage module 126 may also store at least a portion of the updated filed in the private storage cloud 120, as discussed above.

In one embodiment, the storage module 126 (and/or storage module 136) may generate metadata 127 indicative of which recovery data chunks (in a set of recovery data chunks for the file) are stored in which public storage clouds, as discussed in more detail below. For example, the storage module 126 may generate a table that indicates where each recovery data chunk (in the set of recovery data chunks for the file) is stored (e.g., which public storage cloud stores which recovery data chunk). In another example, the storage module may generate a table that indicates where each chunk of the file (e.g., each file chunk) is stored (e.g., which public storage cloud stores which file chunk). The storage module 126 may also update the metadata 127 when a file is updated. For example, the second (e.g., updated) set of recovery data chunks may be stored on different public storage clouds than the previous set of recovery data chunks. The storage module 126 may update the metadata 127 to indicate which public storage clouds stored second set of recovery data chunks. The storage module 126 may also update the metadata 127 to indicate that a new version of the file was created.

In one embodiment, the protection level of the recovery data chunks (e.g., the systematic recovery data chunks and/or the non-systematic recovery data chunks) may be based on the importance level. The protection level of the recovery data chunks may indicate how easy it is to recover a file using the recovery data chunks. For example, the higher the protection level, the fewer non-systematic data recovery chunks may be used to reconstruct the file (e.g., for high protection level, two recovery data chunks may be used to reconstruct the file but for a lower protection level, four recovery data chunks may be used to reconstruct the file). The protection level of the recovery data chunks may also indicate how resistant the recovery data chunks are to loss. For example, different data recovery (or error recovery) schemes/codes may still allow recovery/reconstruction of a file even when number of recovery data chunks are lost or inaccessible. A higher protection level may allow a higher number of recovery data chunks to become lost/inaccessible while still allowing recovery/reconstruction of the file, and vice versa.

In one embodiment, the storage application 111 may receive a request for a file stored in the storage system 100. For example, the storage application 111 may present a graphical user interface (or other interface, such as a command line interface) to a user of the computing device 110. The GUI may allow the user to read, write, modify, upload, download, files, etc. The storage application 111 may receive a request to read (e.g., access) a file stored in the storage system 100 (e.g., which may be stored and/or distributed among the private storage clouds 130 through 120 and public storage clouds 140A though 140X) via the GUI.

In one embodiment, the storage application may determine whether the file is retrievable from one or more of the public storage clouds 140A through 140X. For example, the storage application 111 may determine whether there are enough recovery data chunks stored in the public storage clouds 140A though 140X to reconstruct the file (from the recovery data chunks). In another example, the storage application 111 may determine whether file chunks (e.g., all of the portions, pieces, chunks, etc.) of the file have been stored (e.g., distributed) across the public storage clouds 140A through 140X. If the file is not retrievable from public storage clouds 140A through 140X, the storage application 111 may retrieve the file from private storage cloud 120. For example, if there are not enough recovery data chunks for the file in the public storage clouds 140A through 140X to reconstruct/regenerate the file, the storage application 111 may retrieve the file from the private storage cloud 120. In another example, if file chunks (for the file) are not stored in the public storage clouds 140A through 140X, the storage application 111 may retrieve the file from the private storage cloud 120.

If the file is retrievable from public storage clouds 140A through 140X (e.g., if there are file chunks for the file or if there are enough recovery data chunks for the file stored in the public storage clouds 140A through 140X), the storage application 111 may determine whether access to the public storage clouds 140A though 140X is faster than access to the private storage cloud 120 (and/or private storage cloud 130). For example, the storage application 111 may determine the access latency (e.g., round-trip delay (RTD), round-trip time (RTT), ping time, etc.) for the private storage cloud 120 through 130 and the public storage clouds 140A through 140X. In another example, the storage application 111 may determine the data throughput for the private storage cloud 120 through 130 and the public storage clouds 140A through 140X (e.g., the amount of data that may be accessed/downloaded over a period of time from a public/private storage cloud).

In one embodiment, the storage application 111 may retrieve (e.g., download, access, read, etc.) the file from one or more of the private storage clouds 120 through 130, and public storage clouds 140A through 140X based on whether access to the public storage clouds 140A though 140X is faster than access to the private storage cloud 120 (and/or private storage cloud 130), if the file is retrievable from public storage clouds 140A through 140X. For example, the storage application 111 may retrieve the file from the private storage cloud 120 (e.g., may retrieve, download, access, etc., recovery data chunks and/or file chunks) when throughput to the private storage cloud 120 is faster than the throughput to the public storage clouds 140A through 140X. Throughput to the private storage cloud 120 may be faster when the computing device 110 is on a network (e.g., a local-area network (LAN)) of the private storage cloud 120. In another example, the storage application 111 may retrieve the file from one or more of the public storage clouds 140A through 140X (e.g., may retrieve, download, access, etc., recovery data chunks and/or file chunks) when throughput to one or more of the public storage clouds 140A through 140X is faster than the throughput to the private storage cloud 120.

In one embodiment, the storage application 111 may determine whether the private storage cloud 120 and the public storage clouds 140A through 140X may be accessed in parallel. For example, the storage application 111 may determine whether the computing device 110 is able to access the private storage cloud 120 and one or more of public storage clouds 140A through 140X, simultaneously (e.g., by pinging and/or transmitting messages to the private storage cloud 120 and one or more of public storage clouds 140A through 140X and determining whether responses to the messages/pings are received). If the private storage cloud 120 and the public storage clouds 140A through 140X may be accessed in parallel, the storage application 111 may retrieve one or more portions of the file from the private storage cloud 120 and may retrieve one or more portions from the public storage clouds 140A through 140X. For example, the storage application 111 may retrieve one file chunk (of the file) from the private storage cloud 120 and may retrieve three file chunks (of the file) from the public storage clouds 140A through 140X. In another example, the storage application 111 may retrieve two recovery data chunks (of the file) from the private storage cloud 120 and may retrieve seven recovery data chunks (of the file) from the public storage clouds 140A through 140X.

If the private storage cloud 120 and the public storage clouds 140A through 140X may not be accessed in parallel, the storage application 111 may retrieve the file from the public storage clouds 140A through 140X. For example, the storage application 111 may download all of the file chunks (of the file) from one or more of the public storage clouds 140A through 140X and may combine the file chunks (e.g., concatenate the file chunks) to generate/obtain the file. In another example, the storage application 111 may download recovery data chunks from one or more of the public storage clouds 140A through 140X and may reconstruct (e.g., generate, obtain, etc.) the file using the recovery data chunks. The storage application 111 may download the minimum number of recovery data chunks that can be used to reconstruct (e.g., regenerate, rebuild, etc.) the file, based on the data recovery (or error recovery) scheme/code used to generate the recovery data chunks.

In one embodiment, the storage application 111 (and/or the storage module 126) may determine a hotness level for the file if the file is not retrievable from the public storage clouds 140A through 140X. For example, the storage application 111 may analyze the file and/or the contents of the file to determine the hotness level of the file. In another example, the storage application 111 may determine the hotness level of the file based on data/input received from a user of the storage system 100 (e.g., a user may provide the hotness level for the file using storage application 111). In a further example the storage application 111 may determine the hotness level of the file based on a configuration file/setting. In one example, the storage application 111 may receive the hotness level for the file from the storage module 126 (and/or storage module 136). For example, the storage module 126 may determine the hotness level of the file and may provide the hotness level to the storage application 111.

In one embodiment, the storage application 111 may store one or more file chunks of the file (e.g., one or more portions of the file) and/or one or more recovery data chunks for the file on one or more of the public storage clouds 140A through 140X if the hotness level of the file is above a threshold hotness level. For example, the storage application 111 may divide the file into a set of file chunks (e.g., potions, pieces, etc.) and may store one or more of the file chunks on one or more of the public storage clouds 140A through 140X, if the hotness level of the file is above the threshold hotness level. In another example, the storage application 111 may generate recovery data chunks for the file and may store one or more of the recovery data chunks on one or more of the public storage clouds 140A through 140X, if the hotness level of the file is above the threshold hotness level.

In another embodiment, the storage application 111 may provide the file to the storage module 126 and the storage module 126 may store one or more file chunks of the file (e.g., one or more portions of the file) and/or one or more recovery data chunks for the file on one or more of the public storage clouds 140A through 140X if the hotness level of the file is above a threshold hotness level. For example, the storage application 111 may transmit the file to the storage module 126 and the storage module 126 may divide the file into chunks and/or generate recovery data chunks if the hotness level of the file is above the threshold hotness level. The storage module 126 may store the file chunks and/or the recovery data chunks on one or more of the public storage clouds 140A through 140X.

In one embodiment, the storage application 111 may determine whether the latest version of the file is retrievable from one or more of the public storage clouds 140A through 140X. For example, the storage application 111 may communicate with the storage module 126 (and/or the storage module 136) to determine whether the latest version of the file (e.g., file chunks for the latest version of the file, recovery data chunks for the latest version of the file, etc.) is retrievable from one or more of the public storage clouds 140A through 140X. In another example, the storage application 111 may access the metadata 127 stored on the NAS device 125 to determine whether the latest version of the file is retrievable from one or more the public storage clouds 140A through 140X, as discussed in more detail below. If the latest version of the file is not retrievable from the public storage clouds 140A through 140X, the storage application 111 may retrieve the file from the private storage cloud 120 (and/or private storage cloud 130). For example, the storage application 111 may download the file from the NAS device 125. The storage application 111 may also request that the latest version of the file be stored in the public storage clouds 140A through 140X when the latest version of the file is not retrievable from the public storage clouds 140A through 140X. For example, the storage application 111 may transmit a message (e.g., a request) to the storage module 126 (and/or storage module 136) indicating that the storage module 126 should divide the file in to file chunks and/or should generate recovery data chunks (e.g., generate systematic recovery data chunks, generate non-systematic recovery data chunks, etc.)

In one embodiment, the storage module 126 (and/or the storage application 111) may track the version of file that is stored in the storage system 100. For example, the version of the file may be changed each time a user updates the file (e.g., the user edits the file). The storage module 126 (and/or the storage application 111) may maintain version information (e.g., data indicating the different version of the file, the latest version of the file, etc.) in the metadata 127. For example, the version may be a numerical value that is incremented each time the file is changed/updated by the user. Other types of information that may be use to track the version of the file may be a timestamp indicating the last time a file was updated/modified, the size of the file, etc. In another embodiment, the storage module 126 (and/or the storage application 111) may periodically distribute an updated file through the storage system 100. For example, if a file (that is stored in the private storage cloud 120) is modified by a user, the storage module 126 may regenerate new file chunks and/or recovery data chunks and may distribute the chunks among the public storage clouds 140A through 140X.

One having ordinary skill in the art understands that the operations, methods, actions, processes, etc., described herein may be performed by one or more of the storage module 126, the storage module 136, and/or the storage application 111. For example, the storage module 126 may perform some of the operations described herein (e.g., generating file chunks) while the storage application 111 may perform other operations described herein (e.g., retrieving file chunks). In another example, the storage application 111 may perform all of the operations described herein (e.g., generating file chunks, transmitting the file chunks to the public storage clouds, and retrieving the file chunks).

In the embodiments, examples, implementations, etc., disclosed herein, the storage system (e.g., the hybrid storage system) may use three importance levels: importance level 0, importance level 1, and importance level 2. A higher importance level may indicate that a file is more important to a user, and vice versa. The storage system may also use three privacy levels: privacy level 0, privacy level 1, and privacy level 2. A higher privacy level may indicate that the user wants to keep the file more private, and vice versa. The storage system may further use two hotness levels: hotness level 0, and hotness level 1. A higher hotness level may indicate that a file may be more frequently accessed within a period of time (within a shorter period or more recently), and vice versa. One having ordinary skill in the art understands that different numbers of importance levels, privacy levels, and/or hotness levels may be used in other embodiments.

In some embodiments, distributing the file chunks (for a file) and/or recovery data chunks (e.g., systematic recovery data chunks, non-systematic recovery data chunks) across the private storage clouds 120 through 130 and the public storage clouds 140A through 140X may allow a user faster access to the file. For example, the user may be able to access (e.g., download) the different file chunks from the public storage clouds 140A through 140X simultaneously which may allow the user to download the file from the public storage clouds 140A through 140X more quickly (e.g., by downloading different portions/chunks of the file from different public storage clouds). In another example, the user may be able to access (e.g., download) the different recovery data chunks from the public storage clouds 140A through 140X simultaneously. This may allow the user to download the recovery data chunks from the public storage clouds 140A through 140X more quickly (e.g., by downloading different recovery data chunks of the file from different public storage clouds) and reconstruct, rebuild, regenerate, etc., the file from the recovery data chunks.

In some embodiments, distributing the file chunks (for a file) and/or recovery data chunks (e.g., systematic recovery data chunks, non-systematic recovery data chunks) across the private storage clouds 120 through 130 and the public storage clouds 140A through 140X may allow a user faster access to the file based on their location. For example, storing the file and/or chunks (e.g., file chunks, recovery data chunks, etc.) of the file on the private storage cloud may allow the user to access the file more quickly if the user is on the LAN provided by the private storage cloud (e.g., if the user is at home, at work, etc.). In another example, storing the file and/or chunks (e.g., file chunks, recovery data chunks, etc.) of the file on the public storage clouds may allow the user to access the file more quickly if the user is outside of the private storage clouds (e.g., outside of home/work, at a coffee shop, etc.).

In some embodiments, distributing the set of chunks across the private storage clouds 120 through 130 and the public storage clouds 140A through 140X may also help increase the security of the storage system 100. For example, if one public storage cloud is compromised by another user (e.g., a malicious user), the other user may still be unable to obtain the file because other file chunks and/or other recovery data chunks are stored on other public storage clouds and the other user would be unable to reconstruct, rebuild, regenerate, etc., the file without comprising the other public storage clouds.

In some embodiments, encrypting the file chunks and/or the recovery data chunks may also increase the security of the storage system 100. For example, if one or more public storage cloud are compromised by another user (e.g., a malicious user), the user may still not be able to reconstruct, rebuild, regenerate, etc., the file because the file chunks and/or the recovery data chunks are encrypted prior to storing the file chunks and/or the recovery data chunks on the private storage clouds 120 through 130 and the public storage clouds 140A through 140X.

Figure 2A:
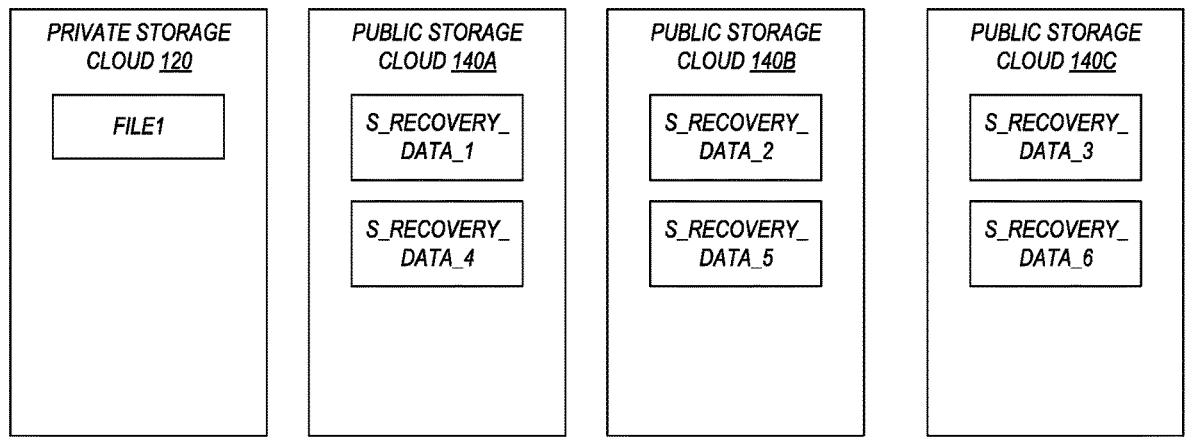
FIG. 2A is a diagram illustrating an example distribution of a file in a storage system, in accordance with one or more embodiments.

FIG. 2A is a diagram illustrating an example distribution of a file in a storage system, in accordance with one or more embodiments. As discussed above, a file, such as FILE1, may be stored in a storage system (e.g., storage system 100 illustrated in FIG. 1). The storage system may be a hybrid storage system that includes a private storage cloud 120, public storage cloud 140A, public storage cloud 140B, and public storage cloud 140C. The private storage cloud 120 may include a NAS device that may store the FILE1. Each of the public storage cloud 140A, 140B, and 140C may be separate/different storage service providers (e.g., a company, entity, service provider, etc., that provides storage space/capacity for storing data).

As illustrated in FIG. 2A, FILE1 is stored on the private storage cloud 120. For example, the complete file FILE1 is stored in a memory (e.g., magnetic media, flash media, etc.) on a NAS device of the private storage cloud 120 (e.g., NAS device 125 illustrated in FIG. 1). Also as illustrated in FIG. 2A, recovery data chunks are distributed among the public storage clouds 140A, 140B, and 140C. The recovery data chunks may be systematic recovery data chunks (e.g., systematic recovery data, etc.) S_RECOVERY_DATA_1 and S_RECOVERY_DATA_4 are stored on public storage cloud 140A, S_RECOVERY_DATA_2 and S_RECOVERY_ DATA_5 are stored on public storage cloud 140B, and S_RECOVERY_DATA_3 and S_RECOVERY_DATA_6 are stored on public storage cloud 140C. The protection level of the recovery data S_RECOVERY_DATA_1 through S_RECOVERY_DATA_6 may be based on the importance level of the file, as discussed above. For example, for a lower importance level, the systematic recovery data (e.g., S_RECOVERY_DATA_1 through S_RECOVERY_DATA_6) may be generated using exclusive OR (XOR) operations. In another example, for a higher importance level, the systematic recovery data (e.g., S_RECOVERY_DATA_1 through S_RECOVERY_DATA_6) may be generated using RAID functions/operations. In one embodiment, the recovery data may be encrypted based on the privacy level of the file, as discussed above. For example, S_RECOVERY_DATA_1 through S_RECOVERY_DATA_6 may be encrypted before they are stored on the public storage clouds 140A through 140C if the privacy level for FILE1 is greater than a privacy threshold.

As discussed above, a client device (e.g., a storage application on the client device) may download FILE1 from the private storage cloud 120 and/or one or more of the public storage clouds 140A through 140C based on whether the client device is able to access the private storage cloud 120 and public storage clouds 140A through 140C simultaneously. The client device may also determine whether access to the public storage clouds 140A though 140C is faster than access to the private storage cloud 120, as discussed above. For example, if access to the private storage cloud 120 is faster (e.g., the client device is on a LAN of the private storage cloud 120), the client device may download FILE1 from the private storage cloud 120. In another example, if access to the public storage clouds 140A through 140C is faster, the client device may download one or more of the systematic recovery data (e.g., one or more of S_RECOVERY_DATA_1 through S_RECOVERY_DATA_6) and may reconstruct, regenerate, etc., the file using the systematic recovery data. If the systematic recovery data is encrypted, the client device may also decrypt the systematic recovery data.

Figure 2B:
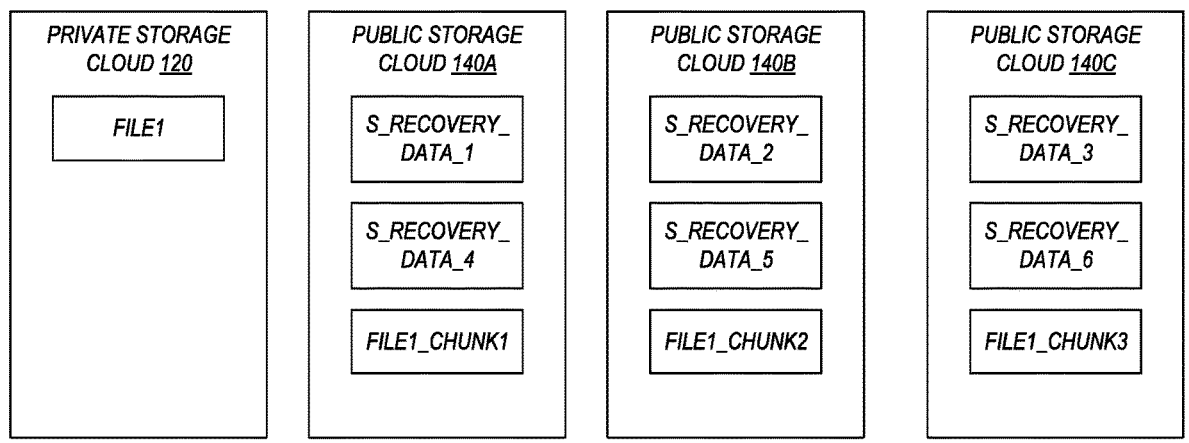
FIG. 2B is a diagram illustrating an example distribution of a file in a storage system, in accordance with one or more embodiments.

FIG. 2B is a diagram illustrating an example distribution of a file in a storage system, in accordance with one or more embodiments. As discussed above, a file, such as FILE1, may be stored in a storage system (e.g., storage system 100 illustrated in FIG. 1). The storage system may be a hybrid storage system that includes a private storage cloud 120, public storage cloud 140A, public storage cloud 140B, and public storage cloud 140C. The private storage cloud 120 may include a NAS device that may store the FILE1. Each of the public storage cloud 140A, 140B, and 140C may be separate/different storage service providers (e.g., a company, entity, service provider, etc., that provides storage space/capacity for storing data).

As illustrated in FIG. 2B, FILE1 (e.g., all of FILE1) is stored on the private storage cloud 120, as discussed above. Also as illustrated in FIG. 2A, FILE1 is divided into three file chunks, FILE1_CHUNK1, FILE1_CHUNK2, and FILE1_CHUNK3. FILE1_CHUNK1 is stored on public storage cloud 140A, FILE1_CHUNK2 is stored on public storage cloud 140B, and FILE1_CHUNK3 is stored on public storage cloud 140C. In addition, recovery data chunks are distributed among the public storage clouds 140A, 140B, and 140C. The recovery data chunks may be systematic recovery data chunks (e.g., systematic recovery data, etc.) S_RECOVERY_DATA_1 and S_RECOVERY_DATA_4 are stored on public storage cloud 140A, S_RECOVERY_DATA_2 and S_RECOVERY_DATA_5 are stored on public storage cloud 140B, and S_RECOVERY_DATA_3 and S_RECOVERY_DATA_6 are stored on public storage cloud 140C. The protection level of the recovery data S_RECOVERY_DATA_1 through S_RECOVERY_DATA_6 may be based on the importance level of the file, as discussed above. In one embodiment, the recovery data may be encrypted based on the privacy level of the file, as discussed above.

As discussed above, a client device (e.g., a storage application on the client device) may download FILE1 from the private storage cloud 120 and/or one or more of the public storage clouds 140A through 140C based on whether the client device is able to access the private storage cloud 120 and public storage clouds 140A through 140C simultaneously. The client device may also determine whether access to the public storage clouds 140A though 140C is faster than access to the private storage cloud 120, as discussed above. For example, if access to the private storage cloud 120 is faster (e.g., the client device is on a LAN of the private storage cloud 120), the client device may download FILE1 from the private storage cloud 120. In another example, if access to the public storage clouds 140A through 140C is faster, the client device may download one or more of the systematic recovery data (e.g., one or more of S_RECOVERY_DATA_1 through $S_{13}$ RECOVERY_DATA_6) and may reconstruct, regenerate, etc., the file using the systematic recovery data. If the systematic recovery data is encrypted, the client device may also decrypt the systematic recovery data. In a further example, if access to the public storage clouds 140A through 140C is faster, the client device may download the file chunks (e.g., FILE1_CHUNK1 through FILE1_CHUNK3) and may obtain the file using the file chunks (e.g., may append, concatenate, combine, etc., the file chunks together). If the file chunks are encrypted, the client device may also decrypt the file chunks.

Figure 2C:
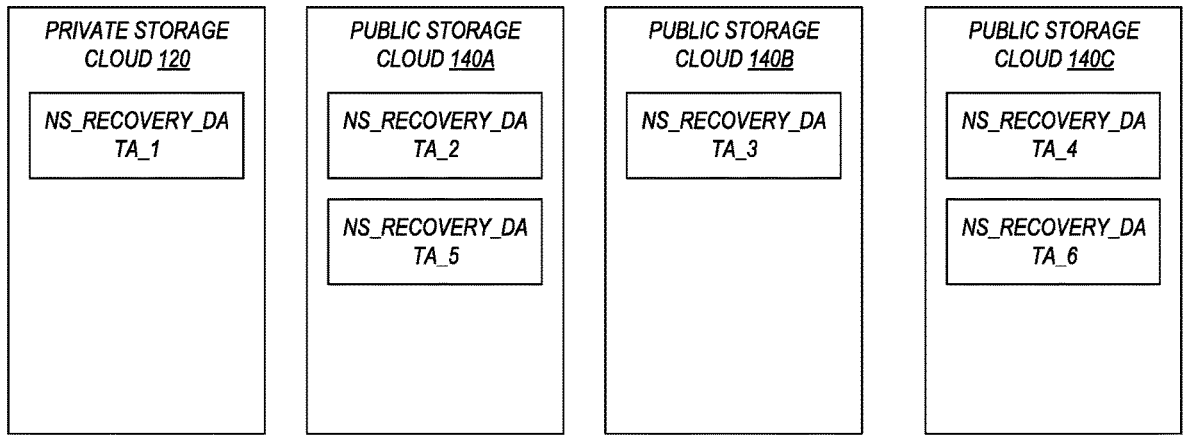
FIG. 2C is a diagram illustrating an example distribution of a file in a storage system, in accordance with one or more embodiments.

FIG. 2C is a diagram illustrating an example distribution of a file in a storage system, in accordance with one or more embodiments. As discussed above, a file, such as FILE2 (not illustrated in FIG. 2C), may be stored in a storage system (e.g., storage system 100 illustrated in FIG. 1). The storage system may be a hybrid storage system that includes a private storage cloud 120, public storage cloud 140A, public storage cloud 140B, and public storage cloud 140C. The private storage cloud 120 may include a NAS device. Each of the public storage cloud 140A, 140B, and 140C may be separate/different storage service providers (e.g., a company, entity, service provider, etc., that provides storage space/capacity for storing data).

As illustrated in FIG. 2C, recovery data chunks are distributed among the public storage clouds 140A, 140B, and 140C. The recovery data chunks may be non-systematic recovery data chunks (e.g., non-systematic recovery data, etc.) NS_RECOVERY_DATA_1 is stored in the private storage cloud 120, NS_RECOVERY_DATA_2 and NS_RECOVERY_DATA_5 are stored on public storage cloud 140A, NS_RECOVERY_DATA_3 is stored on public storage cloud 140B, and NS_RECOVERY_DATA_4 and NS_RECOVERY_DATA_6 are stored on public storage cloud 140C. The protection level of the recovery data NS_RECOVERY_DATA_1 through NS_RECOVERY_DATA_6 may be based on the importance level of the file, as discussed above. In one embodiment, the recovery data may be encrypted based on the privacy level of the file, as discussed above.

As discussed above, a client device (e.g., a storage application on the client device) may download FILE2 from the private storage cloud 120 and/or one or more of the public storage clouds 140A through 140C based on whether the client device is able to access the private storage cloud 120 and public storage clouds 140A through 140C simultaneously. The client device may also determine whether access to the public storage clouds 140A though 140C is faster than access to the private storage cloud 120, as discussed above. If access to the private storage cloud 120 is faster, the client device may download NS_RECOVERY_DATA_1 from the private storage cloud 120 and may download one or more of the remaining recovery data from the public storage clouds 140A through 140C. For example, if at least three non-systematic recovery data chunks out of the six non-systematic recovery data chunks are be used to reconstruct FILE2, the client device may download NS_RECOVERY_DATA_1 from the private storage cloud 120 and may download two other non-systematic recovery data chunks (e.g., NS_RECOVERY_DATA_2 and NS_RECOVERY_DATA_4) one or more of the public storage clouds 140A through 140C. If access to the public storage clouds 140A through 140C is faster, the client device may download one or more of the non-systematic recovery data chunks (e.g., one or more of NS_RECOVERY_DATA_1 through NS_RECOVERY_DATA_6) from the public storage clouds 140A through 140C and may reconstruct, regenerate, etc., the file using the non-systematic recovery data chunks. For example, if at least three non-systematic recovery data chunks out of the six non-systematic recovery data chunks are be used to reconstruct FILE2, the client device may download NS_RECOVERY_DATA_2 and NS_RECOVERY_DATA_4 from public storage cloud 140A and may download NS_RECOVERY_DATA_3 from public storage cloud 140B. If the non-systematic recovery data chunks are encrypted, the client device may also decrypt the non-systematic recovery data chunks.

Figure 2D:
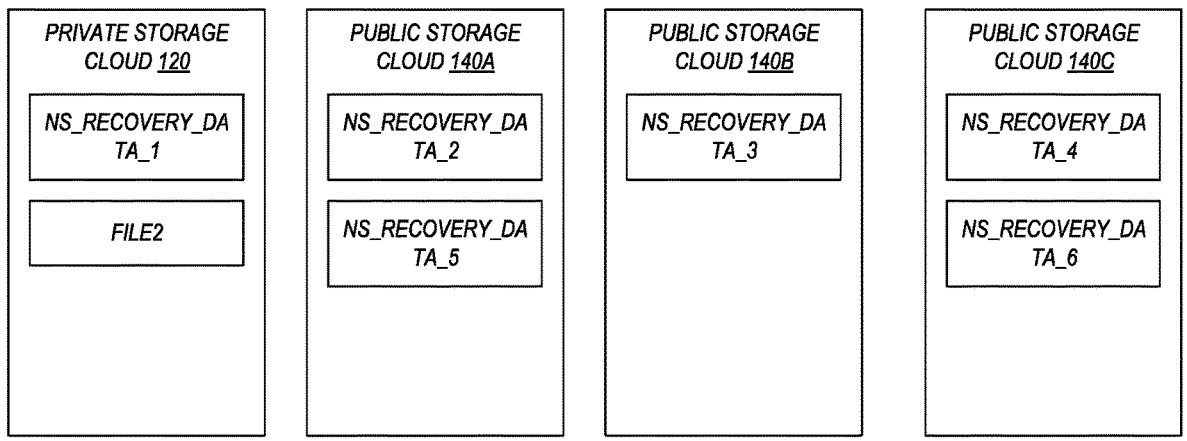
FIG. 2D is a diagram illustrating an example distribution of a file in a storage system, in accordance with one or more embodiments.

FIG. 2D is a diagram illustrating an example distribution of a file in a storage system, in accordance with one or more embodiments. As discussed above, a file, such as FILE2, may be stored in a storage system (e.g., storage system 100 illustrated in FIG. 1). The storage system may be a hybrid storage system that includes a private storage cloud 120, public storage cloud 140A, public storage cloud 140B, and public storage cloud 140C. Each of the public storage cloud 140A, 140B, and 140C may be separate/different storage service providers (e.g., a company, entity, service provider, etc., that provides storage space/capacity for storing data).

As illustrated in FIG. 2D, FILE2 is stored on the private storage cloud 120. For example, the complete file FILE2 is stored in a memory (e.g., magnetic media, flash media, etc.) on a NAS device of the private storage cloud 120 (e.g., NAS device 125 illustrated in FIG. 1). Also as illustrated in FIG. 2D, recovery data chunks are distributed among the public storage clouds 140A, 140B, and 140C. The recovery data chunks may be non-systematic recovery data chunks (e.g., non-systematic recovery data, etc.) NS_RECOVERY_DATA_1 is stored in the private storage cloud 120, NS_RECOVERY_DATA_2 and NS_RECOVERY_DATA_5 are stored on public storage cloud 140A, NS_RECOVERY_DATA_3 is stored on public storage cloud 140B, and NS_RECOVERY_DATA_4 and NS_RECOVERY_DATA_6 are stored on public storage cloud 140C. The protection level of the recovery data NS_RECOVERY_DATA_1 through NS_RECOVERY_DATA_6 may be based on the importance level of the file, as discussed above. In one embodiment, the recovery data may be encrypted based on the privacy level of the file, as discussed above.

As discussed above, a client device (e.g., a storage application on the client device) may download FILE2 from the private storage cloud 120 and/or one or more of the public storage clouds 140A through 140C based on whether the client device is able to access the private storage cloud 120 and public storage clouds 140A through 140C simultaneously. The client device may also determine whether access to the public storage clouds 140A though 140C is faster than access to the private storage cloud 120, as discussed above. If access to the private storage cloud 120 is faster, the client device may download FILE2 from the private storage cloud 120. If access to the public storage clouds 140A through 140C is faster, the client device may download one or more of the non-systematic recovery data chunks (e.g., one or more of NS_RECOVERY_DATA_1 through NS_RECOVERY_DATA_6) from the public storage clouds 140A through 140C and may reconstruct, regenerate, etc., the file using the non-systematic recovery data chunks, as discussed above. If the non-systematic recovery data chunks are encrypted, the client device may also decrypt the non-systematic recovery data chunks.

Figure 2E:
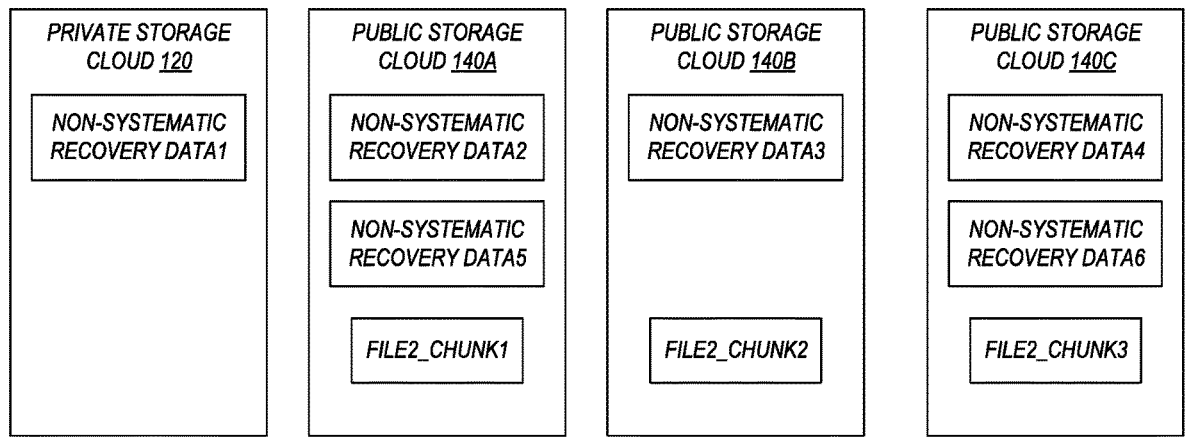
FIG. 2E is a diagram illustrating an example distribution of a file in a storage system, in accordance with one or more embodiments.

FIG. 2E is a diagram illustrating an example distribution of a file in a storage system, in accordance with one or more embodiments. As discussed above, a file, such as FILE2 (not illustrated in FIG. 2E), may be stored in a storage system (e.g., storage system 100 illustrated in FIG. 1). The storage system may be a hybrid storage system that includes a private storage cloud 120, public storage cloud 140A, public storage cloud 140B, and public storage cloud 140C. The private storage cloud 120 may include a NAS device. Each of the public storage cloud 140A, 140B, and 140C may be separate/different storage service providers (e.g., a company, entity, service provider, etc., that provides storage space/capacity for storing data).

As illustrated in FIG. 2E, FILE2 is divided into three file chunks, FILE2_CHUNK1, FILE2_CHUNK2, and FILE2_CHUNK3. FILE2_CHUNK1 is stored on public storage cloud 140A, FILE2_CHUNK2 is stored on public storage cloud 140B, and FILE2_CHUNK3 is stored on public storage cloud 140C. Also as illustrated in FIG. 2D, recovery data chunks are distributed among the public storage clouds 140A, 140B, and 140C. The recovery data chunks may be non-systematic recovery data chunks (e.g., non-systematic recovery data, etc.) NS_RECOVERY_DATA_1 is stored in the private storage cloud 120, NS_RECOVERY_DATA_2 and NS_RECOVERY_DATA_5 are stored on public storage cloud 140A, NS_RECOVERY_DATA_3 is stored on public storage cloud 140B, and NS_RECOVERY_DATA_4 and NS_RECOVERY_DATA_6 are stored on public storage cloud 140C. The protection level of the recovery data NS_RECOVERY_DATA_1 through NS_RECOVERY_DATA_6 may be based on the importance level of the file, as discussed above. In one embodiment, the recovery data may be encrypted based on the privacy level of the file, as discussed above.

As discussed above, a client device (e.g., a storage application on the client device) may download FILE2 from the private storage cloud 120 and/or one or more of the public storage clouds 140A through 140C based on whether the client device is able to access the private storage cloud 120 and public storage clouds 140A through 140C simultaneously. The client device may also determine whether access to the public storage clouds 140A though 140C is faster than access to the private storage cloud 120, as discussed above. If access to the private storage cloud 120 is faster, the client device may download NS_RECOVERY_DATA_1 from the private storage cloud 120 and may download one or more of the remaining recovery data from the public storage clouds 140A through 140C. For example, if at least three non-systematic recovery data chunks out of the six non-systematic recovery data chunks are be used to reconstruct FILE2, the client device may download NS_RECOVERY_DATA_1 from the private storage cloud 120 and may download two other non-systematic recovery data chunks (e.g., NS_RECOVERY_DATA_2 and NS_RECOVERY_DATA_4) one or more of the public storage clouds 140A through 140C. If access to the public storage clouds 140A through 140C is faster, the client device may download one or more of the non-systematic recovery data chunks (e.g., one or more of S_RECOVERY_DATA_1 through S_RECOVERY_DATA_6) from the public storage clouds 140A through 140C and may reconstruct, regenerate, etc., the file using the non-systematic recovery data chunks. For example, if at least three non-systematic recovery data chunks out of the six non-systematic recovery data chunks are be used to reconstruct FILE2, the client device may download NS_RECOVERY_DATA_2 and NS_RECOVERY_DATA_4 from public storage cloud 140A and may download NS_RECOVERY_DATA_3 from public storage cloud 1406. If the non-systematic recovery data chunks are encrypted, the client device may also decrypt the non-systematic recovery data chunks. The client device may also download file chunks (e.g., FILE2_CHUNK1 through FILE2_CHUNK3) from public storage clouds 140A through 140C and may obtain the file using the file chunks (e.g., may append, concatenate, combine, etc., the file chunks together), if access to the public storage clouds 140A through 140C is faster. If the file chunks are encrypted, the client device may also decrypt the file chunks.

Figure 2F:
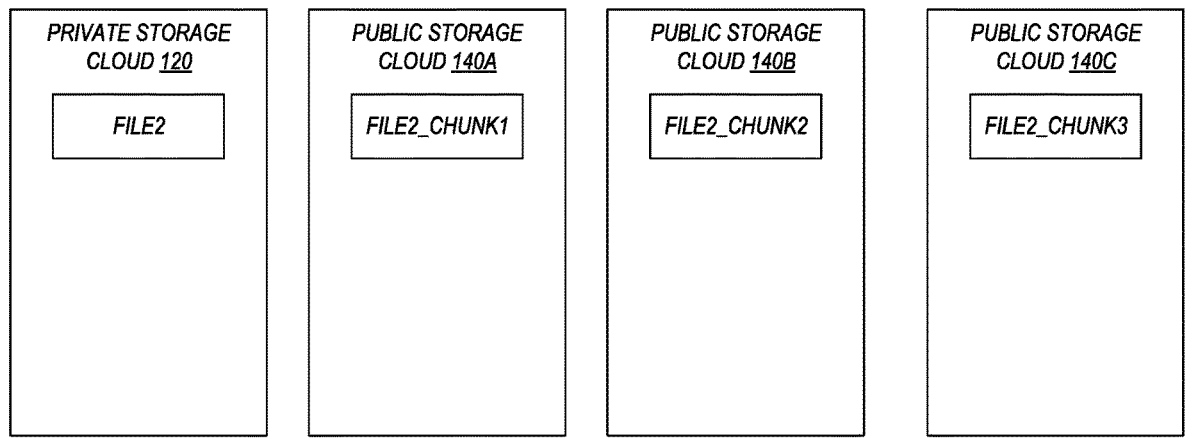
FIG. 2F is a diagram illustrating an example distribution of a file in a storage system, in accordance with one or more embodiments.

FIG. 2F is a diagram illustrating an example distribution of a file in a storage system, in accordance with one or more embodiments. As discussed above, a file, such as FILE2, may be stored in a storage system (e.g., storage system 100 illustrated in FIG. 1). The storage system may be a hybrid storage system that includes a private storage cloud 120, public storage cloud 140A, public storage cloud 140B, and public storage cloud 140C. The private storage cloud 120 may include a NAS device. Each of the public storage cloud 140A, 140B, and 140C may be separate/different storage service providers (e.g., a company, entity, service provider, etc., that provides storage space/capacity for storing data).

As illustrated in FIG. 2F, FILE2 is stored in the private storage cloud 120. For example, the complete file FILE2 is stored in a memory (e.g., magnetic media, flash media, etc.) on a NAS device of the private storage cloud 120 (e.g., NAS device 125 illustrated in FIG. 1). Also as illustrated in FIG. 2F, FILE2 is divided into three file chunks, FILE2_CHUNK1, FILE2_CHUNK2, and FILE2_CHUNK3. FILE2_CHUNK1 is stored on public storage cloud 140A, FILE2_CHUNK2 is stored on public storage cloud 140B, and FILE2_CHUNK3 is stored on public storage cloud 140C.

As discussed above, a client device (e.g., a storage application on the client device) may download FILE2 from the private storage cloud 120 and/or one or more of the public storage clouds 140A through 140C based on whether the client device is able to access the private storage cloud 120 and public storage clouds 140A through 140C simultaneously. The client device may also determine whether access to the public storage clouds 140A though 140C is faster than access to the private storage cloud 120, as discussed above. If access to the private storage cloud 120 is faster, the client device may download FILE2 from the private storage cloud 120. If access to the public storage clouds 140A through 140C is faster, the client device may download file chunks (e.g., FILE2_CHUNK1 through FILE2_CHUNK3) from public storage clouds 140A through 140C and may obtain the file using the file chunks (e.g., may append, concatenate, combine, etc., the file chunks together). If the file chunks are encrypted, the client device may also decrypt the file chunks.

FIG. 3 is a table 300 illustrating example metadata, in accordance with one or more embodiments. The table 300 includes five columns: File Name, Chunk ID, Chunk Location, Recovery Data ID, and Recovery Data Location. The File Name column may indicate file names (e.g., or some other identifier such as a hashes) for files that are stored on the data storage system. The Chunk ID column may indicate names (or other identifiers) for file chunks (e.g., pieces, portions, chunks of a file) which are generated for files that are stored on the data storage system. The Chunk Location column may indicate which public storage clouds store which file chunks. The Recovery Data ID column may indicate names (or other identifiers) for recovery data chunks (e.g., systematic recovery data chunks, non-systematic recovery data chunks, etc.) which are generated for files that are stored on the data storage system. The Recovery Data Location column may indicate which public storage clouds store which recovery data chunks.

As illustrated in FIG. 3, table 300 indicates that there are two files stored in the storage system (e.g., the hybrid storage system), FILE_A and FILE_B. As illustrated by table 300, FILE_A is divided into three file chunks CHUNK_A1, CHUNK_A2, and CHUNK_A3. CHUNK_A1 is stored on PUBLIC_STORAGE_CLOUD1, CHUNK_A2 is stored on PUBLIC_STORAGE_CLOUD2, and CHUNK_A3 is stored on PUBLIC_STORAGE_CLOUD3. Systematic recovery data S_RECOVERY_DATA_A1 through S_RECOVERY_DATA_A6 were generated for FILE_A and are stored in the public storage clouds. S_RECOVERY_DATA_A1 and S_RECOVERY_DATA_A4 are stored in PUBLIC_STORAGE_CLOUD1, S_RECOVERY_DATA_A2 and S_RECOVERY_DATA_A5 are stored in PUBLIC_STORAGE_CLOUD2, and S_RECOVERY_DATA_A3 and S_RECOVERY_DATA_A6 are stored in PUBLIC_STORAGE_CLOUD3.

As indicated by the blank entries in the Chunk ID and Chunk Location columns for FILE_B, FILE_B was not divided into file chunks and no file chunks for FILE_B are stored in the public storage clouds. Non-systematic recovery data NS_RECOVERY_DATA_A1 through S_RECOVERY_DATA_A5 were generated for FILE_B and are stored in the public storage clouds. NS_RECOVERY_DATA_B1 is stored in PRIVATE_STORAGE_CLOUD1. NS_RECOVERY_DATA_B2 and NS_RECOVERY_DATA_B5 are stored in PUBLIC_STORAGE_CLOUD1. NS_RECOVERY_DATA_B3 is stored in PUBLIC_STORAGE_CLOUD2. NS_RECOVERY_DATA_B4 is stored in PUBLIC_STORAGE_CLOUD3.

Figure 4:
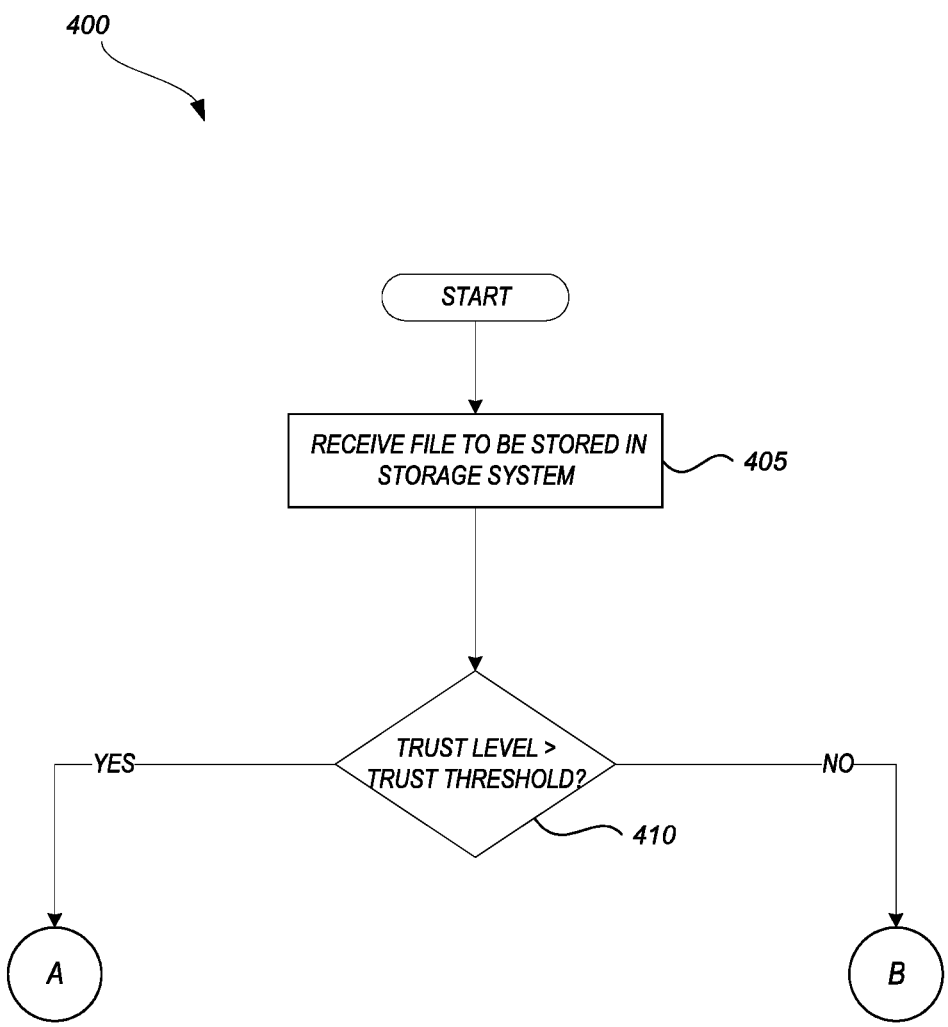
FIG. 4 is a flow diagram illustrating an example process for writing data to a storage system, in accordance with one or more embodiments.

FIG. 4 is a flow diagram illustrating an example process 400 for writing data (e.g., a file) to a storage system, in accordance with one or more embodiments. The storage system may include a private storage cloud (or multiple storage clouds) and may include one or more public storage clouds, as discussed above. The storage system may be referred to as a hybrid storage system. The process 400 may be performed by a storage module (e.g., storage module 126 illustrated in FIG. 1), a storage application (e.g., storage application 111 illustrated in FIG. 1), a processing device (e.g., a processor, a central processing unit (CPU)), and/or a computing device (e.g., a NAS device). The storage module, storage application, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 may receive a file to be stored in the storage system. For example, the file may be received from a client device and/or a storage application (on the client device). At block 410, the process 400 determines whether the trust level of the private storage cloud is greater than a trust threshold (e.g., is greater than a threshold trust level). For example, the data storage system may use two trust levels for private storage clouds, trust level 0 and trust level 1. The process 400 may determine whether the trust level of the private storage cloud is greater than trust level 0. If the trust level of the private storage cloud is greater than trust level 0 (e.g. the trust level is equal to trust level 1), the process 400 may proceed to block A, which is illustrated and discussed in more detail below in conjunction with FIG. 5. If the trust level of the private storage cloud is not greater than trust level 0 (e.g. the trust level is equal to trust level 0), the process 400 may proceed to block B, which is illustrated and discussed in more detail below in conjunction with FIG. 6.

Figure 5:
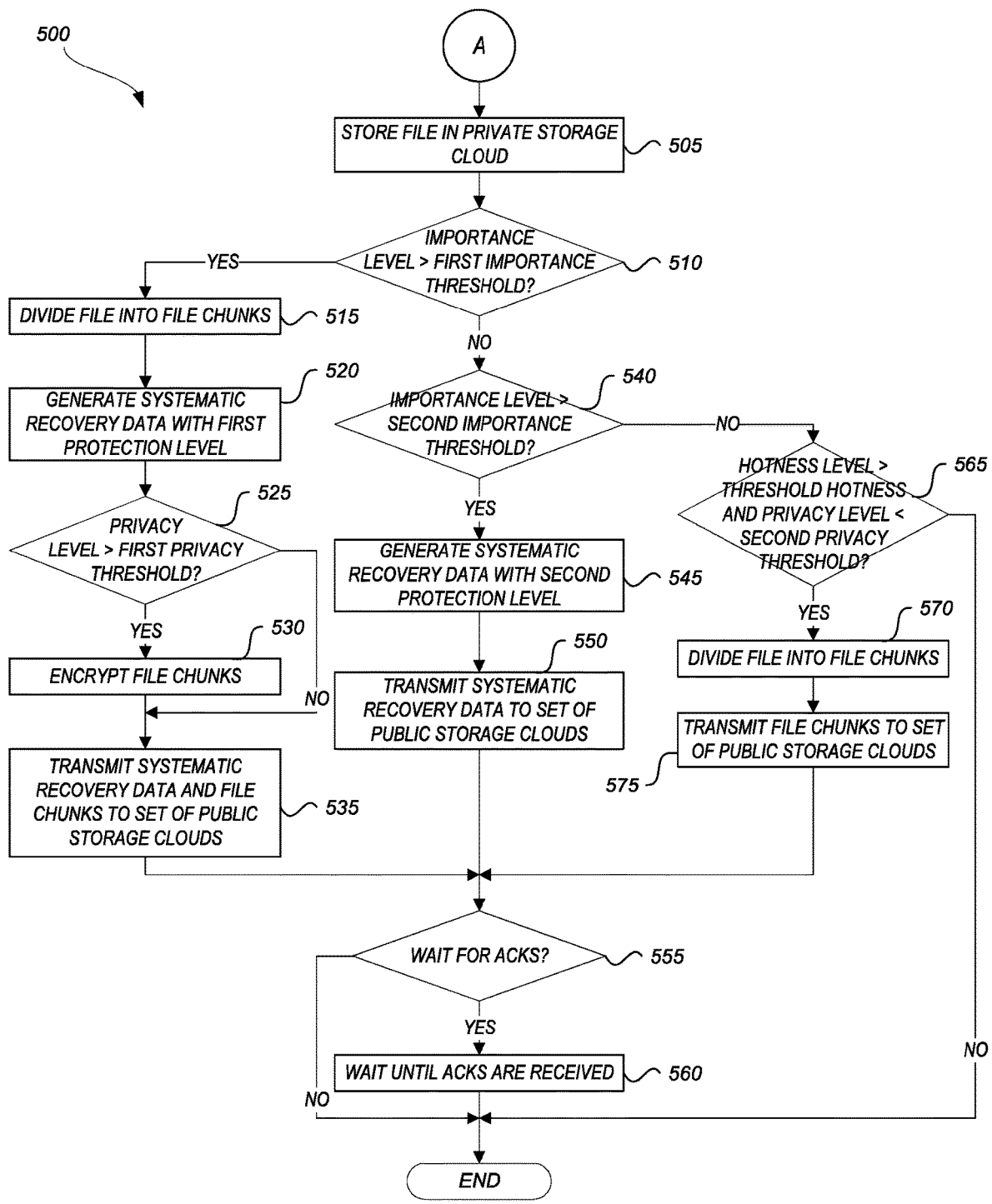
FIG. 5 is a flow diagram illustrating an example process for writing data to a storage system, in accordance with one or more embodiments.

FIG. 5 is a flow diagram illustrating an example process 500 for writing data (e.g., a file) to a storage system, in accordance with one or more embodiments. The storage system may include a private storage cloud (or multiple storage clouds) and may include one or more public storage clouds, as discussed above. The storage system may be referred to as a hybrid storage system. The process 500 may be performed by a storage module (e.g., storage module 126 illustrated in FIG. 1), a storage application (e.g., storage application 111 illustrated in FIG. 1), a processing device (e.g., a processor, a central processing unit (CPU)), and/or a computing device (e.g., a NAS device). The storage module, storage application, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

As discussed above, FIG. 5 illustrates the processes, operations, actions, etc., that may be performed in block A of FIG. 4. In the embodiment illustrated in FIG. 5, the storage system may use three importance levels: importance level 0, importance level 1, and importance level 2. A higher importance level may indicate that a file is more important to a user, and vice versa. The storage system may also use three privacy levels: privacy level 0, privacy level 1, and privacy level 2. A higher privacy level may indicate that the user wants to keep the file more private, and vice versa. The storage system may further use two hotness levels: hotness level 0, and hotness level 1. A higher hotness level may indicate that a file may be more frequently accessed, and vice versa. One having ordinary skill in the art understands that different numbers of importance levels, privacy levels, and/or hotness levels may be used in other embodiments.

The process 500 begins at block 505 where the process 500 may store the file in a private storage cloud, as discussed above. For example, the process 500 may store the file in a NAS device of the private storage cloud. At block 510, the process 500 determines whether the importance level of the file is greater than a first importance threshold, as discussed above. For example, the process 500 may determine whether the importance level of the file is greater than importance level 1 (e.g., whether the importance level of the file is equal to importance level 2). If the importance level of the file is greater than the first importance threshold, the process 500 may divide the file into file chunks (e.g., pieces, portions, chunks, etc.) at block 515. As discussed above, the size of each file chunk may vary in different embodiments (e.g., the size of each file chunk may be in bits, bytes, kilobytes, megabytes, etc.). The process 500 may generate systematic recovery data (e.g., systematic recovery data chunks) with a first protection level at block 520, as discussed above. The first protection level may indicate how easy it is to recover a file using the recovery data chunks and/or may indicate how resistant the recovery data chunks are to loss, as discussed above. At block 525, the process 500 determines whether the privacy level for the file is greater than a first privacy threshold, as discussed above. For example, the process 500 may determine whether the privacy level of the file is greater than privacy level 1 (e.g., whether the privacy level of the file is equal to privacy level 2). If the privacy level of the file is greater than the first privacy level (e.g., the privacy level of the file is equal to privacy level 2), the process 500 may encrypt the file chunks at block 530 (as discussed above) and may proceed to block 535. If the privacy level of the file is not greater than the first privacy level (e.g., the privacy level of the file is equal to privacy level 1 or privacy level 0), the process 500 may proceed to block 535. At block 535, the process 500 may transmit the systematic recovery data and the file chunks (which may be encrypted) to the one or more public storage clouds, as discussed above. After block 535, the process may proceed to block 555.

If the importance level of the file is not greater than the first importance threshold, the process 500 may determine whether the importance level is greater than a second importance threshold at block 540, as discussed above. For example, the process 500 may determine whether the importance level of the file is greater than importance level 0 (e.g., whether the importance level of the file is equal to importance level 1). If the importance level of the file is greater than the second importance threshold, the process 500 may generate systematic recovery data (e.g., systematic recovery data chunks) with a second protection level at block 545, as discussed above. The second protection level may indicate how easy it is to recover a file using the recovery data chunks and/or may indicate how resistant the recovery data chunks are to loss, as discussed above. The second protection level may be lower than the first protection level (e.g., the recovery data chunks with the second protection level may be less resistant to loss and/or it may be harder to recover the file using the recovery data chunks with the second protection level). At block 550, the process may transmit the systematic recovery data to the one or more public storage clouds, as discussed above. After block 550, the process may proceed to block 555.

If the importance level of the file is not greater than the second importance threshold, the process 500 may determine whether hotness level of the file is greater than a threshold hotness (e.g., hotness level 0) and if the privacy level of the file is less than a second privacy threshold (e.g., if the privacy level of the file is equal to privacy level 0) at block 565. If the hotness level is not greater than the threshold hotness and if the privacy level of the file is not less than the second privacy threshold, the process 500 may end. If the hotness level of the file is greater than the threshold hotness (e.g., hotness level 0) and if the privacy level of the file is less than the second privacy threshold, the process 500 may divided the file into chunks at block 570, as discussed above. At block 575, the process 500 may transmit the file chunks to the one or more public storage clouds, as discussed above.

At block 555, the process 500 may determine whether to wait for acknowledgements (e.g., acks) for the systematic recovery data and/or file chunks that were transmitted to the one or more public storage clouds, as discussed above. For example, the process 500 may determine whether to wait acknowledgements (from the one more public storage clouds) indicating that file chunks were received/stored. In another example, the process 500 may determine whether to wait acknowledgements (from the one more public storage clouds) indicating that recovery data chunks were received/stored. If the process 500 should wait for acknowledgments, the process 500 may proceed to block 560 where the process 500 may wait for acknowledgments from the one or more public storage clouds (e.g., may wait until the acknowledgements are received). For example, the process 500 may periodically check whether the acknowledgments were received. In one embodiment, the process 500 may retransmit the systematic recovery data and/or file chunks if acknowledgments are not received after a period of time, at block 560. After block 560, the process 500 ends.

Figure 6:
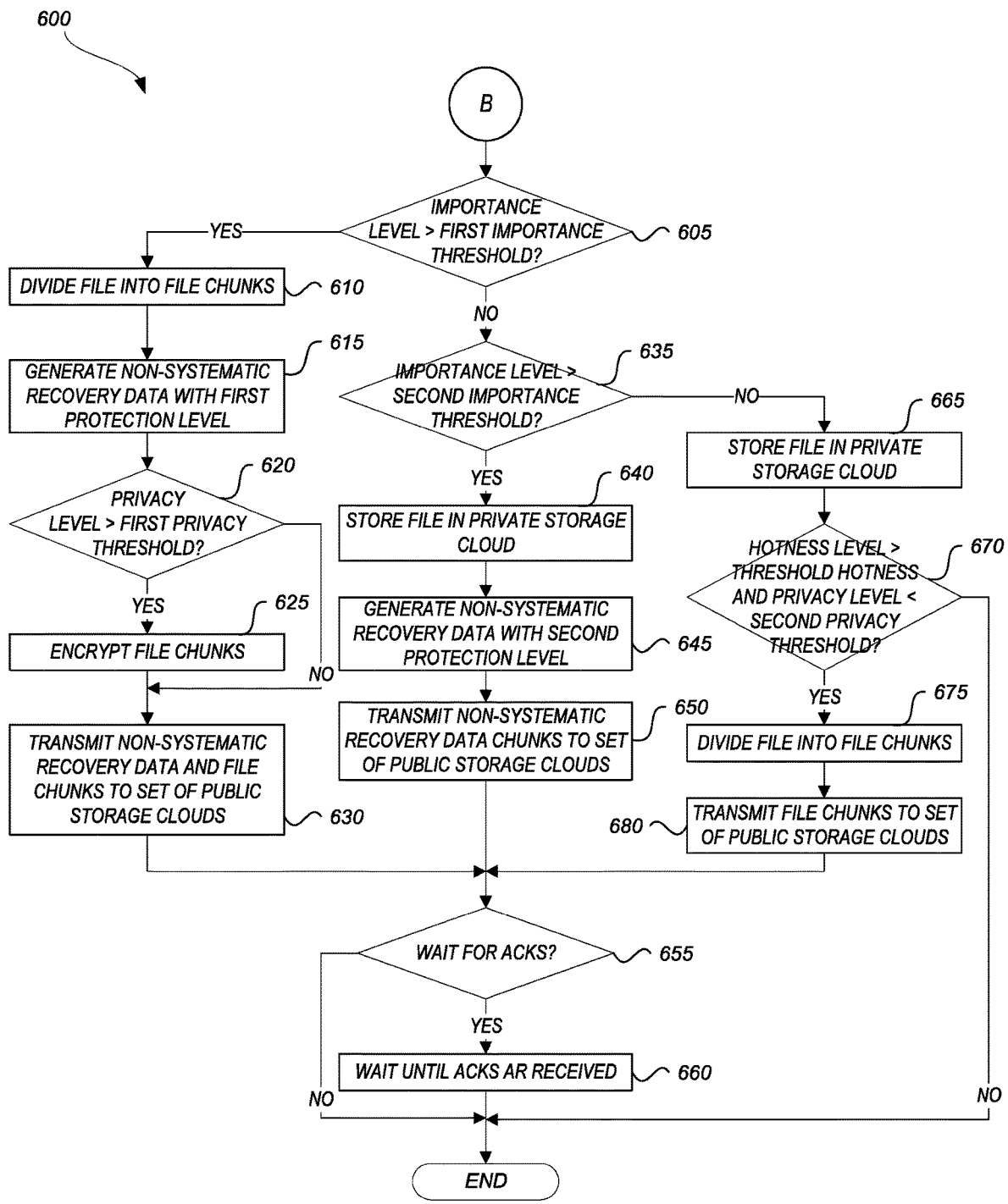
FIG. 6 is a flow diagram illustrating an example process for writing data to a storage system, in accordance with one or more embodiments.

FIG. 6 is a flow diagram illustrating an example process 600 for writing data (e.g., a file) to a storage system, in accordance with one or more embodiments. The storage system may include a private storage cloud (or multiple storage clouds) and may include one or more public storage clouds, as discussed above. The storage system may be referred to as a hybrid storage system. The process 600 may be performed by a storage module (e.g., storage module 126 illustrated in FIG. 1), a storage application (e.g., storage application 111 illustrated in FIG. 1), a processing device (e.g., a processor, a central processing unit (CPU)), and/or a computing device (e.g., a NAS device). The storage module, storage application, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

As discussed above, FIG. 6 illustrates the processes, operations, actions, etc., that may be performed in block B of FIG. 4. In the embodiment illustrated in FIG. 6, the storage system may use three importance levels: importance level 0, importance level 1, and importance level 2. A higher importance level may indicate that a file is more important to a user, and vice versa. The storage system may also use three privacy levels: privacy level 0, privacy level 1, and privacy level 2. A higher privacy level may indicate that the user wants to keep the file more private, and vice versa. The storage system may further use two hotness levels: hotness level 0, and hotness level 1. A higher hotness level may indicate that a file may be more frequently accessed, and vice versa. One having ordinary skill in the art understands that different numbers of importance levels, privacy levels, and/or hotness levels may be used in other embodiments.

The process 600 begins at block 605 where the process 600 determines whether the importance level of the file is greater than a first importance threshold, as discussed above. For example, the process 600 may determine whether the importance level of the file is greater than importance level 1 (e.g., whether the importance level of the file is equal to importance level 2). If the importance level of the file is greater than the first importance threshold, the process 600 may divide the file into file chunks (e.g., pieces, portions, chunks, etc.) at block 610. As discussed above, the size of each file chunk may vary in different embodiments (e.g., the size of each file chunk may be in bits, bytes, kilobytes, megabytes, etc.). The process 600 may generate non-systematic recovery data (e.g., non-systematic recovery data chunks) with a first protection level at block 615, as discussed above. The first protection level may indicate how easy it is to recover a file using the recovery data chunks and/or may indicate how resistant the recovery data chunks are to loss, as discussed above. At block 620, the process 600 determines whether the privacy level for the file is greater than a first privacy threshold, as discussed above. For example, the process 600 may determine whether the privacy level of the file is greater than privacy level 1 (e.g., whether the privacy level of the file is equal to privacy level 2). If the privacy level of the file is greater than the first privacy level (e.g., the privacy level of the file is equal to privacy level 2), the process 600 may encrypt the file chunks at block 625 (as discussed above) and may proceed to block 630. If the privacy level of the file is not greater than the first privacy level (e.g., the privacy level of the file is equal to privacy level 1 or privacy level 0), the process 600 may proceed to block 630. At block 630, the process 600 may transmit the non-systematic recovery data and the file chunks (which may be encrypted) to the one or more public storage clouds, as discussed above. After block 635, the process may proceed to block 655.

If the importance level of the file is not greater than the first importance threshold, the process 600 may determine whether the importance level is greater than a second importance threshold at block 635, as discussed above. For example, the process 600 may determine whether the importance level of the file is greater than importance level 0 (e.g., whether the importance level of the file is equal to importance level 1). If the importance level of the file is greater than the second importance threshold, the process 600 may store the file in the private storage cloud at block 640. For example, the process 600 may store the file in a NAS device of the private storage cloud. At block 645, the process 600 may generate non-systematic recovery data (e.g., non-systematic recovery data chunks) with a second protection level at block 640, as discussed above. The second protection level may indicate how easy it is to recover a file using the recovery data chunks and/or may indicate how resistant the recovery data chunks are to loss, as discussed above. The second protection level may be lower than the first protection level (e.g., the recovery data chunks with the second protection level may be less resistant to loss and/or it may be harder to recover the file using the recovery data chunks with the second protection level). At block 650, the process may transmit the non-systematic recovery data to the one or more public storage clouds, as discussed above. After block 650, the process may proceed to block 655.

If the importance level of the file is not greater than the second importance threshold, the process 600 may store the file in the private storage cloud at block 665, as discussed above. At block 670, the process 600 may determine whether hotness level of the file is greater than a threshold hotness (e.g., hotness level 0) and if the privacy level of the file is less than a second privacy threshold (e.g., if the privacy level of the file is equal to privacy level 0). If the hotness level is not greater than the threshold hotness and if the privacy level of the file is not less than the second privacy threshold, the process 600 may end. If the hotness level of the file is greater than the threshold hotness (e.g., hotness level 0) and if the privacy level of the file is less than the second privacy threshold, the process 600 may divided the file into chunks at block 675, as discussed above. At block 680, the process 600 may transmit the file chunks to the one or more public storage clouds, as discussed above.

At block 655, the process 600 may determine whether to wait for acknowledgements (e.g., acks) for the non-systematic recovery data and/or file chunks that were transmitted to the one or more public storage clouds, as discussed above. For example, the process 600 may determine whether to wait acknowledgements (from the one more public storage clouds) indicating that file chunks were received/stored. In another example, the process 600 may determine whether to wait acknowledgements (from the one more public storage clouds) indicating that recovery data chunks were received/stored. If the process 600 should wait for acknowledgments, the process 600 may proceed to block 660 where the process 600 may wait for acknowledgments from the one or more public storage clouds (e.g., may wait until the acknowledgements are received). For example, the process 600 may periodically check whether the acknowledgments were received. In one embodiment, the process 600 may retransmit the non-systematic recovery data and/or file chunks if acknowledgments are not received after a period of time, at block 660. After block 660, the process 600 ends. In one embodiment, the process 600 may delete a cached or temporary copy of the file at block 660. For example, if the file is not stored on the private storage cloud based on the importance level of the file, the process 600 may generate the non-systematic data chunks and the file chunks using the file. After generating the non-systematic data chunks and the file chunks, the process 600 may delete the file. The process 600 may also delete the non-systematic data chunks and/or the file chunks which were generated (to be transmitted to the public storage clouds) but are not stored on the private storage cloud.

Figure 7:
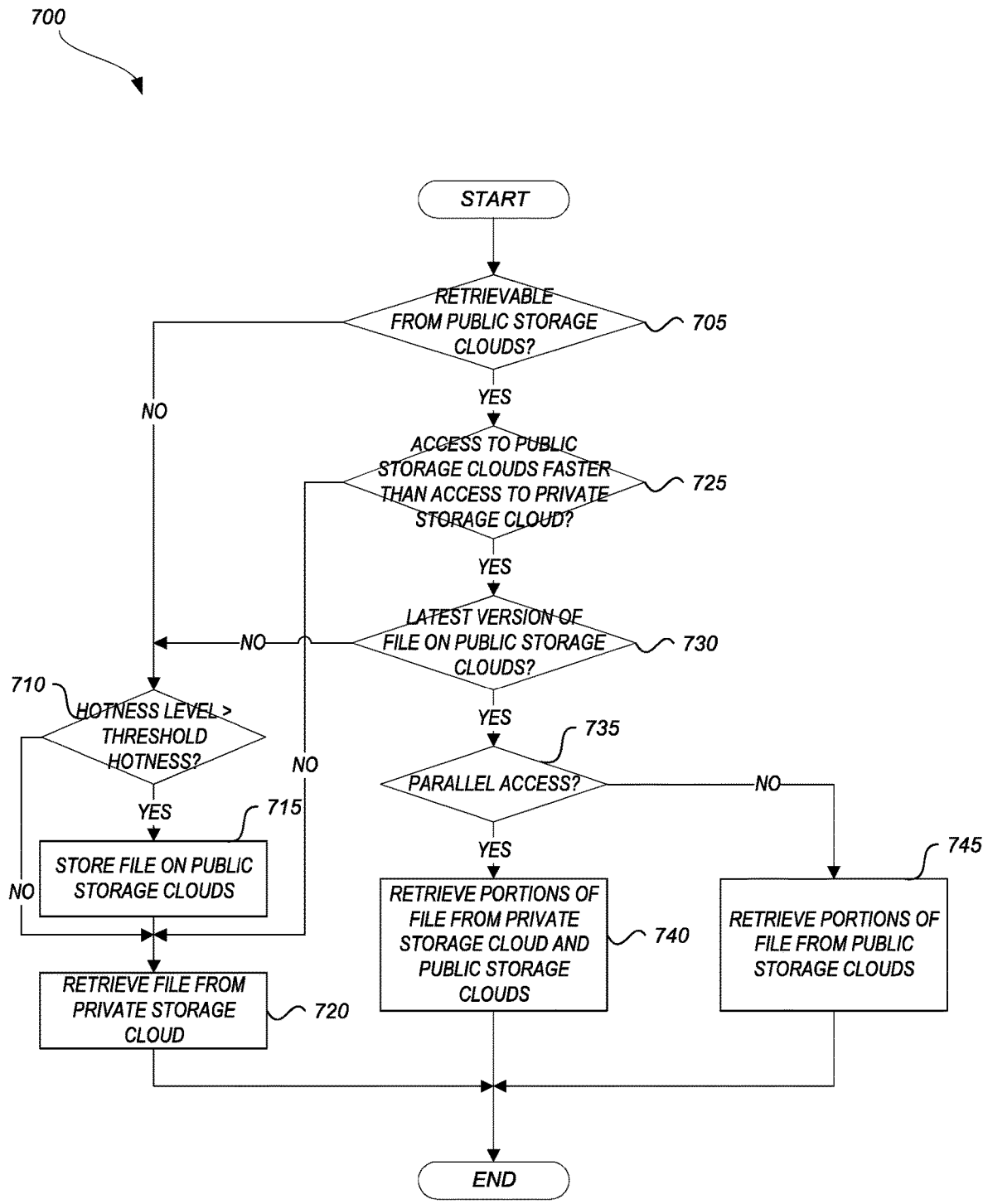
FIG. 7 is a flow diagram illustrating an example process for reading data from a storage system, in accordance with one or more embodiments.

FIG. 7 is a flow diagram illustrating an example process 700 for reading data (e.g., downloading a file) in a storage system, in accordance with one or more embodiments. The storage system may include a private storage cloud (or multiple storage clouds) and may include one or more public storage clouds, as discussed above. The storage system may be referred to as a hybrid storage system. The process 700 may be performed by a storage module (e.g., storage module 126 illustrated in FIG. 1), a storage application (e.g., storage application 111 illustrated in FIG. 1), a processing device (e.g., a processor, a central processing unit (CPU)), and/or a computing device (e.g., a NAS device). The storage module, storage application, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

The process 700 begins at block 705 where the process 700 may determine whether the file is retrievable from the public storage clouds, as discussed above. For example, the process 700 may access metadata (illustrated in FIGS. 1 and 3) to determine whether file chunks and/or recovery data for the file is stored in the one or more public storage clouds. If the file is not retrievable from the one or more public storage clouds, the process 700 may proceed to block 710. If the file is retrievable from the one or more public storage clouds, the process 700 may determine whether access to the public storage clouds is faster than access to the private storage cloud at block 725, as discussed above. For example, the process 700 may ping the private storage cloud and the one or more public storage clouds. In another example, the process 700 may determine the throughputs of the private storage cloud and the one or more public storage clouds. If access to the one or more public storage clouds is not faster than access to the private storage cloud, the process 700 may proceed to block 720.

If access to one or more public store clouds is faster, the process may determine whether the latest version of the file (e.g., file chunks of the file, recovery data chunks of the file, etc.) are stored on the one or more public storage clouds. For example, the process 700 may access metadata (illustrated in FIGS. 1 and 3) to determine whether the latest version of the file is stored on the one or more public storage clouds. If the latest version of the file is stored on the one or more public storage clouds, the process 700 may determine whether it is possible to access the private storage cloud and the one or more public storage clouds in parallel at block 735, as discussed above. If the private storage cloud and the one or more public storage clouds can be accessed in parallel, the process 700 may retrieve portions of the file from the file from the private storage cloud and the one or more public storage clouds at block 740, as discussed above. For example, the process 700 may download one or more file chunks from the private storage cloud and may download one or more file chunks from the public storage clouds. In another example, the process 700 may download one or more file recovery data chunks from the private storage cloud and may download one or more recovery data chunks from the public storage clouds. After block 740, the process 700 ends. If the private storage cloud and the one or more public storage clouds cannot be accessed in parallel, the process 700 may retrieve the portions of the file from the one or more storage clouds at block 745, as discussed above. For example, the process 700 may download file chunks (for the file) from the public storage clouds. In another example, the process 700 may download recovery data chunks from the public storage clouds. After block 745, the process 700 ends.

As discussed above, the process 700 may proceed to block 710 if the file is not retrievable from the one or more public storage clouds. The process 700 may determine whether the hotness level of the file is greater than a threshold hotness, as discussed above. For example, the process 700 may analyze the file to determine a hotness level for the file and may compare the hotness level of the file to the threshold hotness (e.g., a threshold hotness level). In another example, the process 700 may receive user input indicating the hotness level of the file and may compare the hotness level of the file to the threshold hotness. If the hotness level for the file is greater than the threshold hotness, the process 700 may store the file on the one or more public storage clouds at block 715. For example, the process 700 may generate file chunks and may transmit the file chunks to the public storage clouds. In another example, the process 700 may generate recovery data chunks and may transmit the recovery data chunks to the public storage clouds. If the hotness level of the files is not greater than the threshold hotness, the process 700 may proceed to block 720. The process 700 may retrieve the file from the private storage cloud at block 720. For example, the process 700 may download the file from the private storage cloud. After block 720, the process 700 ends.

Figure 8:
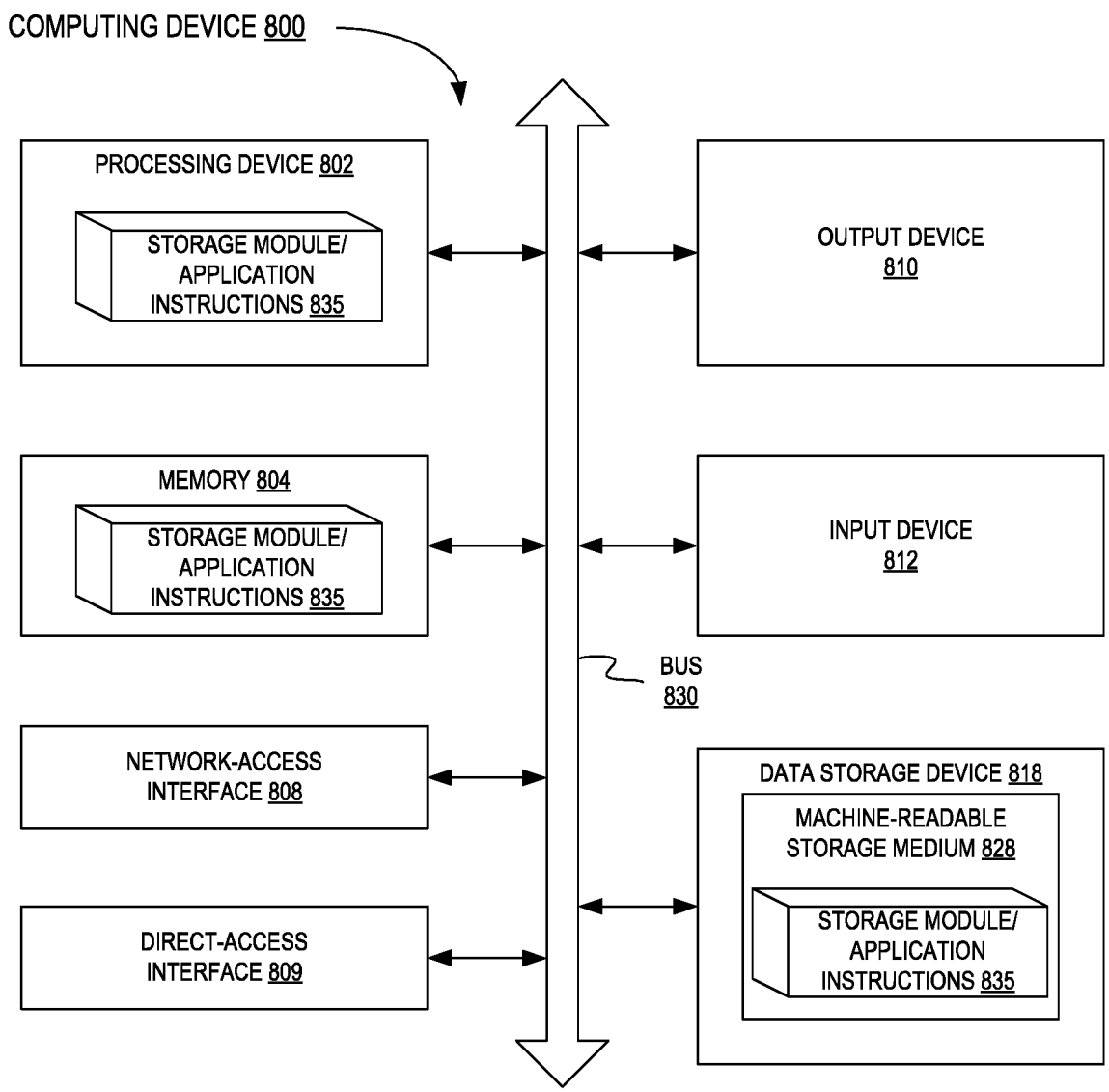
FIG. 8 is a diagram of a computing device, in accordance with one or more embodiments.

FIG. 8 is a diagram of a computing device 800, in accordance with one or more embodiments. The computing device 800 may execute instructions that may cause the computing device 800 to perform any one or more of the methodologies (e.g., operations, methods, functions, etc.) discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer, a NAS device, a set-top box (STB), etc., within which a set of instructions, for causing the machine to perform any one or more of the methodologies discussed herein, may be executed. The machine may also be any machine/device capable of executing a set of instructions (sequential or otherwise) that specify actions to be taken by that machine/device. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 800 includes a processing device (e.g., a processor, a controller, a central processing unit (CPU), etc.) 802, a main memory 804 (e.g., read-only memory (ROM), flash memory, dynamic random access memory (DRAM) such as synchronous DRAM (SDRAM)), a network-access interface 808, a direct-access interface 809, an output device, 810, an input device 812, and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute storage module/application instructions 835 (e.g., instructions for the storage module 126, storage module 136, and/or storage application 111 illustrated in FIG. 1) for performing the operations and steps discussed herein.

The computing device 800 may include a network-access interface 808 (e.g., a network interface card, a Wi-Fi interface, etc.) which may communicate with a network (e.g., network 170 illustrated in FIG. 1). The computing device may also include a direct-access interface 809 (e.g., a USB interface, an eSATA interface, a Thunderbolt interface, etc.). The computing device 800 also may include an output device 810 (e.g., a liquid crystal display (LCD) or a cathode ray tube (CRT)), and an input device 812 (e.g., a mouse, a keyboard, etc.). In one embodiment, the output device 810 and the input device 812 may be combined into a single component or device (e.g., an LCD touch screen).

The data storage device 818 may include a computer-readable storage medium 828 on which is stored one or more sets of instructions (e.g., storage module/application instructions 835) embodying any one or more of the methodologies or functions described herein. The storage module/application instructions 835 may also reside, completely or at least partially, within the main memory 804 and/or within the processing device 802 during execution thereof by the computing device 800. The main memory 804 and the processing device 802 may also constitute computer-readable media. The instructions may further be transmitted or received over via the network-access interface 808 and/or direct-access interface 809.

While the computer-readable storage medium 828 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium (e.g., a non-transitory computer-readable medium) or other computer storage device or collection of storage devices. Some or all of the methods may alternatively be embodied in specialized computer hardware.

What is claimed is:

1. An apparatus, comprising:
   a memory configured to store data; and
   a processor coupled to the memory, the processor configured to:
   determine an importance level for a file to be stored in a storage system comprising a private storage cloud and a set of public storage clouds;
   generate a set of recovery data chunks based on the file and the importance level;
   store the file in the storage system with at least a portion of the file stored in the private storage cloud;
   compare the importance level to at least one of a first importance threshold and a second importance threshold that is less than the first importance threshold;
   in response to determining that the importance level exceeds the first importance threshold, store file chunks of the file and the set of recovery data chunks of the file in the set of public storage clouds;
   in response to determining that the importance level is from the first importance threshold to the second importance threshold inclusive, store only the set of recovery data chunks of the file in the set of public storage clouds; and
   in response to determining that the importance level is below the second importance threshold, determine whether to store only the file chunks of the file or to store nothing in the set of public storage clouds.

2. The apparatus of claim 1, wherein the file chunks are stored in the set of public storage clouds by:
   determining a privacy level for the file; and
   encrypting the file chunks prior to storing the file chunks in the set of public storage clouds in response to determining that the privacy level exceeds a privacy threshold.

3. The apparatus of claim 1, wherein the processor is further configured to:
   store all portions of the file in the private storage cloud in response to determining that a trust level of the private storage cloud exceeds a trust threshold.

4. The apparatus of claim 1, wherein the processor is further configured to:
   store all portions of the file in the private storage cloud in response to determining that a trust level of the private storage cloud does not exceed a trust threshold and the importance level does not exceed the first importance threshold.

5. The apparatus of claim 1, wherein the set of recovery data chunks is stored separately from the file.

6. The apparatus of claim 1, wherein the set of recovery data chunks comprises the file and parity data.

7. The apparatus of claim 1, wherein the file chunks are stored in the set of public storage clouds by:
determining a privacy level for the file;
determining a hotness level for the file;
dividing the file into a set of file chunks in response to determining that the privacy level does not exceed a privacy threshold and the hotness level exceeds a hotness threshold; and
storing the set of file chunks in the set of public storage clouds, wherein the set of file chunks are distributed among the set of public storage clouds.

8. The apparatus of claim 1, wherein the set of recovery data chunks are stored in the set of public storage clouds by:
transmitting the set of recovery data chunks to the set of public storage clouds; and
waiting for acknowledgements that the set of recovery data chunks has been received by the set of public storage clouds.

9. The apparatus of claim 1, wherein the processor is further configured to:
generate metadata indicative of which recovery data chunks are stored in which public storage clouds in response to storing the set of recovery data chunks in the set of public storage clouds.

10. The apparatus of claim 1, wherein the processor is further configured to:
receive the file from a client computing device via the private storage cloud.

11. The apparatus of claim 1, wherein the processor is further configured to:
determine that the file has been updated;
generate a second set of recovery data chunks based on the updated file and the importance level;
store the second set of recovery data chunks in the set of public storage clouds; and
store at least a portion of the updated file in the private storage cloud.

12. The apparatus of claim 1, wherein a protection level of the set of recovery data chunks is based on the importance level.

13. The apparatus of claim 1, wherein determining whether to store only the file chunks of the file or to store nothing in the set of public storage clouds comprises:
determining a hotness level of the file;
determining a privacy level of the file;
in response to determining that the hotness level exceeds a hotness threshold and that the privacy level exceeds a privacy threshold:
dividing the file into the file chunks; and
transmitting the file chunks to the set of public storage clouds; and
in response to determining that the hotness level does not exceed a hotness threshold or that the privacy level does not exceed a privacy threshold, storing nothing in the set of public storage clouds.

14. A method, comprising:
determining an importance level for a file to be stored in a storage system comprising a private storage cloud and a set of public storage clouds;
generating a set of recovery data chunks based on the file and the importance level;
storing the file in the storage system with at least a portion of the file stored in the private storage cloud;
comparing the importance level to at least one of a first importance threshold and a second importance threshold that is less than the first importance threshold;
in response to determining that the importance level exceeds the first importance threshold, storing file chunks of the file and the set of recovery data chunks of the file in the set of public storage clouds;
in response to determining that the importance level is from the first importance threshold to the second importance threshold inclusive, storing only the set of recovery data chunks of the file in the set of public storage clouds; and
in response to determining that the importance level is below the second importance threshold, determining whether to store only the file chunks of the file or to store nothing in the set of public storage clouds.

15. The method of claim 14, further comprising:
determining a privacy level for the file; and
encrypting the file chunks prior to storing the file chunks in the set of public storage clouds in response to determining that the privacy level exceeds a privacy threshold.

16. The method of claim 14, further comprising:
storing all portions of the file in the private storage cloud in response to determining that a trust level of the private storage cloud exceeds a trust threshold.

17. The method of claim 14, further comprising:
storing all portions of the file in the private storage cloud in response to determining that a trust level of the private storage cloud does not exceed a trust threshold and the importance level does not exceed the first importance threshold.

18. The method of claim 14, wherein the file chunks are stored in the set of public storage clouds by:
determining a privacy level for the file;
determining a hotness level for the file;
dividing the file into a set of file chunks in response to determining that the privacy level does not exceed a privacy threshold and the hotness level exceeds a hotness threshold; and
storing the set of file chunks in the set of public storage clouds, wherein the set of file chunks are distributed among the set of public storage clouds.

19. The method of claim 14, wherein determining whether to store only the file chunks of the file or to store nothing in the set of public storage clouds comprises:
determining a hotness level of the file;
determining a privacy level of the file;
in response to determining that the hotness level exceeds a hotness threshold and that the privacy level exceeds a privacy threshold:
dividing the file into the file chunks; and
transmitting the file chunks to the set of public storage clouds; and
in response to determining that the hotness level does not exceed a hotness threshold or that the privacy level does not exceed a privacy threshold, storing nothing in the set of public storage clouds.

20. An apparatus, comprising:
means for storing data;
means for generating recovery data chunks; and
a processor coupled to the means for storing data, the processor configured to:
determine an importance level for a file to be stored in a storage system comprising a private storage cloud and a set of public storage clouds;

obtain, from the means for generating recovery data chunks, a set of recovery data chunks based on the file and the importance level;

store the file in the storage system with at least a portion of the file in the private storage cloud;

compare the importance level to at least one of a first importance threshold and a second importance threshold that is less than the first importance threshold;

in response to determining that the importance level exceeds the first importance threshold, store file chunks of the file and the set of recovery data chunks of the file in the set of public storage clouds;

in response to determining that the importance level is from the first importance threshold to the second importance threshold inclusive, store only the set of recovery data chunks of the file in the set of public storage clouds; and in response to determining that the importance level is below the second importance threshold, determine whether to store only the file chunks of the file or to store nothing in the set of public storage clouds.

\* \* \* \* \*